(12) United States Patent
Weinstein et al.

(10) Patent No.: US 9,768,969 B2
(45) Date of Patent: Sep. 19, 2017

(54) GROUP AUTHORIZATION METHOD AND SOFTWARE

(75) Inventors: Mark Weinstein, Albuquerque, NM (US); Jonathan Wolfe, Albuquerque, NM (US)

(73) Assignee: Sgrouples, Inc., Mountain View, CA (US)

( * ) Notice: Subject to any disclaimer, the term of this patent is extended or adjusted under 35 U.S.C. 154(b) by 281 days.

(21) Appl. No.: 13/491,876

(22) Filed: Jun. 8, 2012

(65) Prior Publication Data

US 2012/0331568 A1    Dec. 27, 2012

Related U.S. Application Data

(60) Provisional application No. 61/494,519, filed on Jun. 8, 2011.

(51) Int. Cl.
| | | |
|---|---|---|
| G06F 7/04 | (2006.01) | |
| G06F 17/30 | (2006.01) | |
| H04N 7/16 | (2011.01) | |
| H04L 12/18 | (2006.01) | |
| G06Q 50/00 | (2012.01) | |
| H04L 12/58 | (2006.01) | |

(52) U.S. Cl.
CPC ........... *H04L 12/185* (2013.01); *G06Q 50/01* (2013.01); *H04L 51/32* (2013.01)

(58) Field of Classification Search
CPC .... G06Q 10/101; G06Q 10/103; G06Q 50/01; H04L 12/185
USPC ...................................................... 726/26–30
See application file for complete search history.

(56) References Cited

U.S. PATENT DOCUMENTS

| | | | | |
|---|---|---|---|---|
| 6,957,229 | B1 * | 10/2005 | Dyor ............................. | 709/223 |
| 7,617,220 | B2 * | 11/2009 | Crowley et al. ......... | 707/999.01 |
| 7,930,187 | B2 * | 4/2011 | Estrada et al. .................. | 705/1.1 |

(Continued)

FOREIGN PATENT DOCUMENTS

| | | |
|---|---|---|
| RU | 2005134203 | 5/2007 |
| RU | 2007138967 | 4/2009 |

(Continued)

OTHER PUBLICATIONS

User Guide for Cisco Unified MeetingPlace Web Conferencing Release 5.4 Revised Aug. 2007.*

(Continued)

*Primary Examiner* — Dede Zecher
*Assistant Examiner* — Vadim Savenkov
(74) *Attorney, Agent, or Firm* — Jeffrey D. Myers; Justin R. Jackson; Peacock Myers, P.C.

(57) ABSTRACT

A method for sharing information limited by permission comprising a user providing content to be shared, the user specifying a plurality of individuals or Groups with which to share the content, after the providing and specifying, automatically creating a new Group comprising the specified plurality, and distributing the content to the new Group. Also a method for sharing information limited by permission comprising compiling in an online service a plurality of individual members and Groups, providing content associated with the individuals and Groups, and displaying to a user a combined content view capable of being based on any combination of one or more of certain categories of Group and user information.

15 Claims, 32 Drawing Sheets

(56) References Cited

U.S. PATENT DOCUMENTS

| | | |
|---|---|---|
| 8,219,133 B2* | 7/2012 | Counts et al. ............... 455/517 |
| 2002/0099638 A1* | 7/2002 | Coffman et al. .............. 705/37 |
| 2004/0103280 A1* | 5/2004 | Balfanz et al. .............. 713/169 |
| 2008/0034040 A1* | 2/2008 | Wherry et al. .............. 709/204 |
| 2009/0106076 A1* | 4/2009 | Coley ............................ 705/8 |
| 2010/0223155 A1* | 9/2010 | Anderson et al. ............ 705/27 |
| 2010/0293105 A1 | 11/2010 | Blinn et al. |
| 2010/0318571 A1* | 12/2010 | Pearlman et al. ........... 709/225 |
| 2011/0185025 A1* | 7/2011 | Cherukuri et al. .......... 709/206 |
| 2012/0173356 A1* | 7/2012 | Fan et al. .................... 709/204 |
| 2012/0197980 A1* | 8/2012 | Terleski et al. .............. 709/203 |

FOREIGN PATENT DOCUMENTS

| | | |
|---|---|---|
| RU | 2368008 | 9/2009 |
| WO | 2010039392 A | 4/2010 |

OTHER PUBLICATIONS

Inside Facebook Tracking Facebook and the Facebook Platform for Developers and Marketers Facebook Hopes to Increase Growth Through App Invites to Non-Members Dec. 23, 2008.*

Picks of the Week: New Facebook Features by Laurel Miltner | Posted Oct. 8, 2010.*

* cited by examiner

25-d Contributing Member's view of Group Settings Page sG Logo

Group Name

Group Color
(You may change the color you see this group)

Group Profile Pic
Edit Picture

Group Menu
Me
Group A
Group B
Group C
etc...

Group Notifications:

☑ Notify me when someone comments on something I post.
  ☑ By email — (These appear dynamically when the Notify box is checked.)
  ☐ By SMS ☐ Notify me when someone tags me in a photo, video, update or doc.

[Cancel] [Update]

---

25-e Contributing Member's view of Personal Settings Page sG Logo

Group Name

Group Color change
(Change the color you see this group)

Personal Profile Pic
Edit Picture

Group Menu
Me
Group A
Group B
Group C
etc...

Group Notifications:
☑ Notify me when someone comments on something I post.
  ☑ By email — These appear dynamically when the Notify box is checked.
  ☐ By SMS ☐ Notify me when someone tags me in a photo, video, update or doc.

Commenting and Sharing:
☑ Allow people to comment on what I share
☐ Allow people to share my posts outside this group Show the following types of info in my feed and menu:
☑ Photos
☑ Videos
☑ Links
☑ Calendar Events
☑ Docs

[Cancel] [Update]

*FIG. 9*

*FIG. 17*

FIG. 32

GROUP AUTHORIZATION METHOD AND SOFTWARE

CROSS-REFERENCE TO RELATED APPLICATIONS

This application claims priority to and the benefit of the filing of U.S. Provisional Patent Application Ser. No. 61/494,519, entitled "Group Authorization Method and Software", filed on Jun. 8, 2011, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

©2011-2012 Sgrouples, Inc. A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Field of the Invention (Technical Field)

The present invention relates to methods and software for controlling ownership, group membership, and group and user rights as to items of digital content.

Description of Related Art

While social media services (such as Facebook®, MySpace®, and Twitter®) and similar Internet websites provide useful mechanisms to share content among their current members, the ability to create distinct groups with different permissions levels is lacking. Furthermore, there is no way to smoothly handle persons who are not at present members in terms of integrating them into content access.

The present invention solves the problems noted above, as well as others noted in the course of the description below.

BRIEF SUMMARY OF THE INVENTION

The present invention is of a method (and concomitant tangible computer readable medium comprising software) for sharing information limited by permission, comprising: a user providing content to be shared; the user specifying a plurality of individuals or Groups with which to share the content; after the providing and specifying steps, automatically creating a new Group comprising the specified plurality; and distributing the content to the new Group. In the preferred embodiment, it can be the case either that the user and each of the individuals and Groups are members of a same online service or that the user and Groups are members of a same online service but each of the individuals may or may not be. In the latter case, the individuals not members of the online service are automatically invited to become members of the online service.

The invention is also of a method (and concomitant tangible computer readable medium comprising software) for sharing information limited by permission, comprising: compiling in an online service a plurality of individual members and Groups; providing content associated with the individuals and Groups; and displaying to a user a combined content view capable of being based on any combination of one or more of the group consisting of: types of Group content; Groups in which the user is a member; combinations of individual members in Groups in which the user is a member; content shared with the user by any of the user's contacts; content from sources external to the online service; access and permissions levels; and user selectable display settings. In the preferred embodiment, types of Group content includes Group content sharing a same tag or tags generated by Group members, the user can select any subset of the Groups in which they are a member for the display, and the user can select any subset of the individual members in Groups in which the user is a member for the display.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 9 illustrates contributing members' group settings and personal settings pages;

FIG. 17 further illustrates inviting members into a group or groups from an external site;

FIG. 32 illustrates handling of user contacts in the invention.

DETAILED DESCRIPTION OF THE INVENTION

Figure 1:
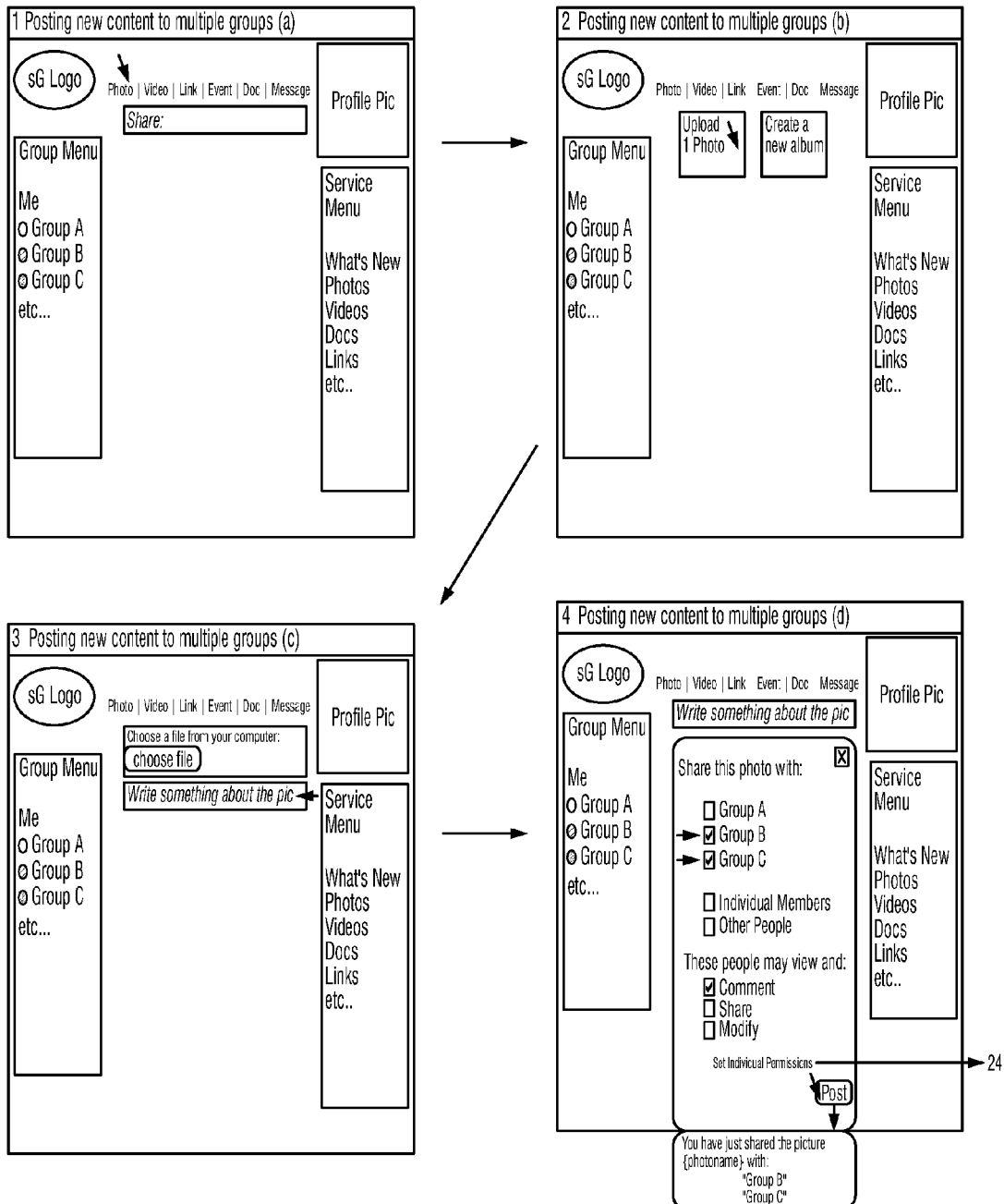
FIG. 1 illustrates posting new content to multiple groups in the present invention.
Figure 2:
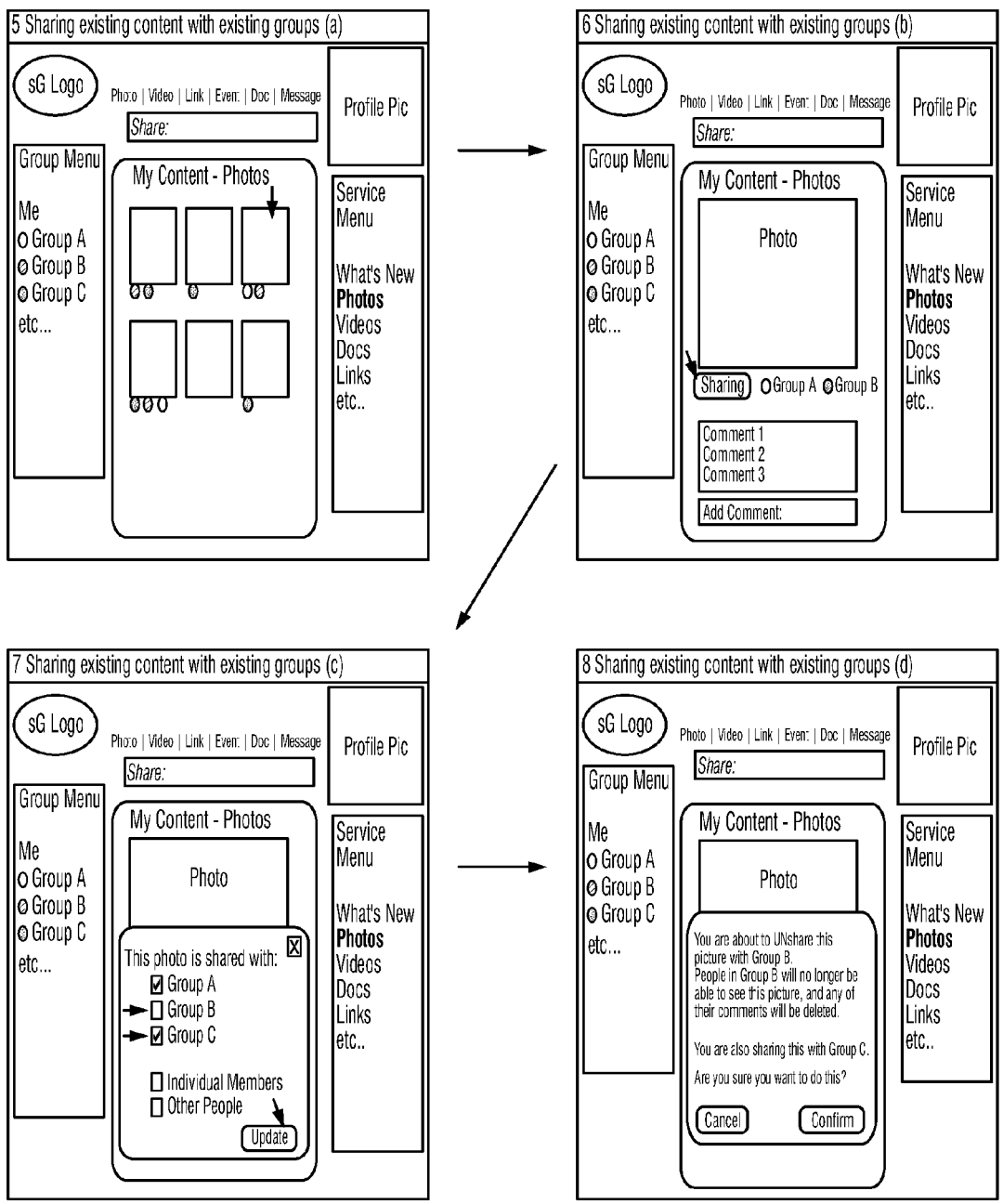
FIG. 2 illustrates sharing existing content with existing groups.
Figure 3:
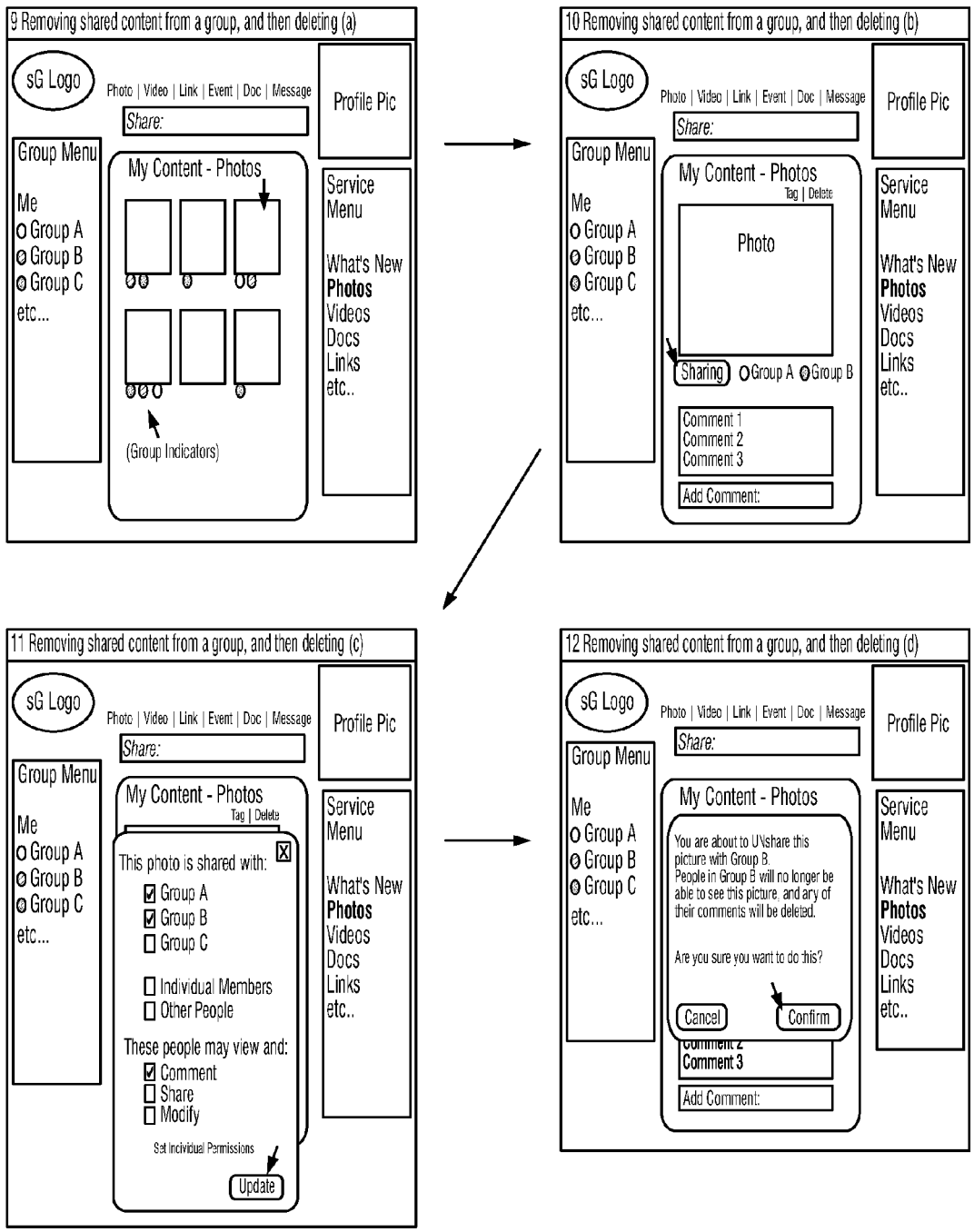
FIG. 3 illustrates removing shared content from a group and then deleting comments.
Figure 4:
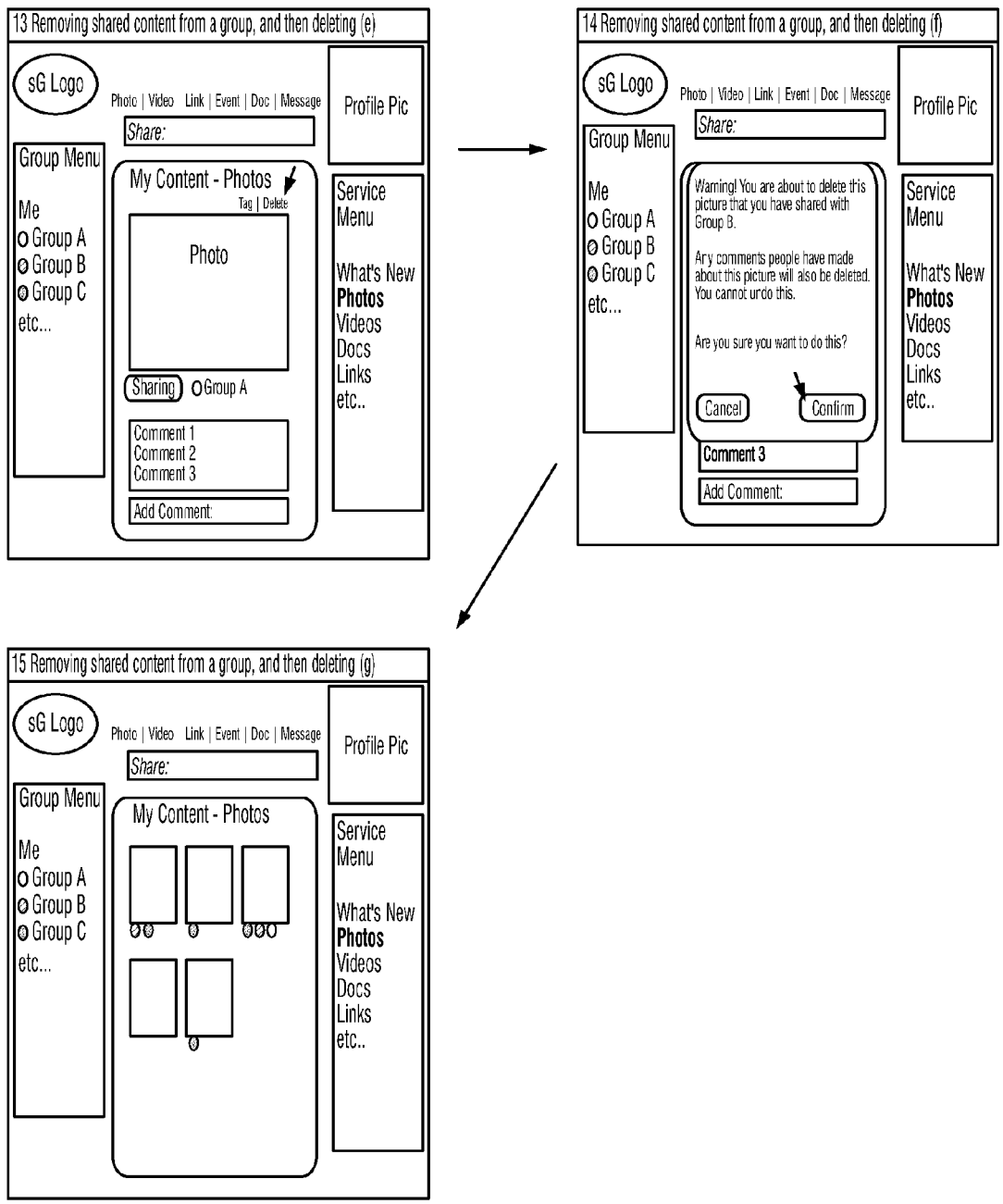
FIG. 4 further illustrates removing shared content from a group and then deleting same.
Figure 5:
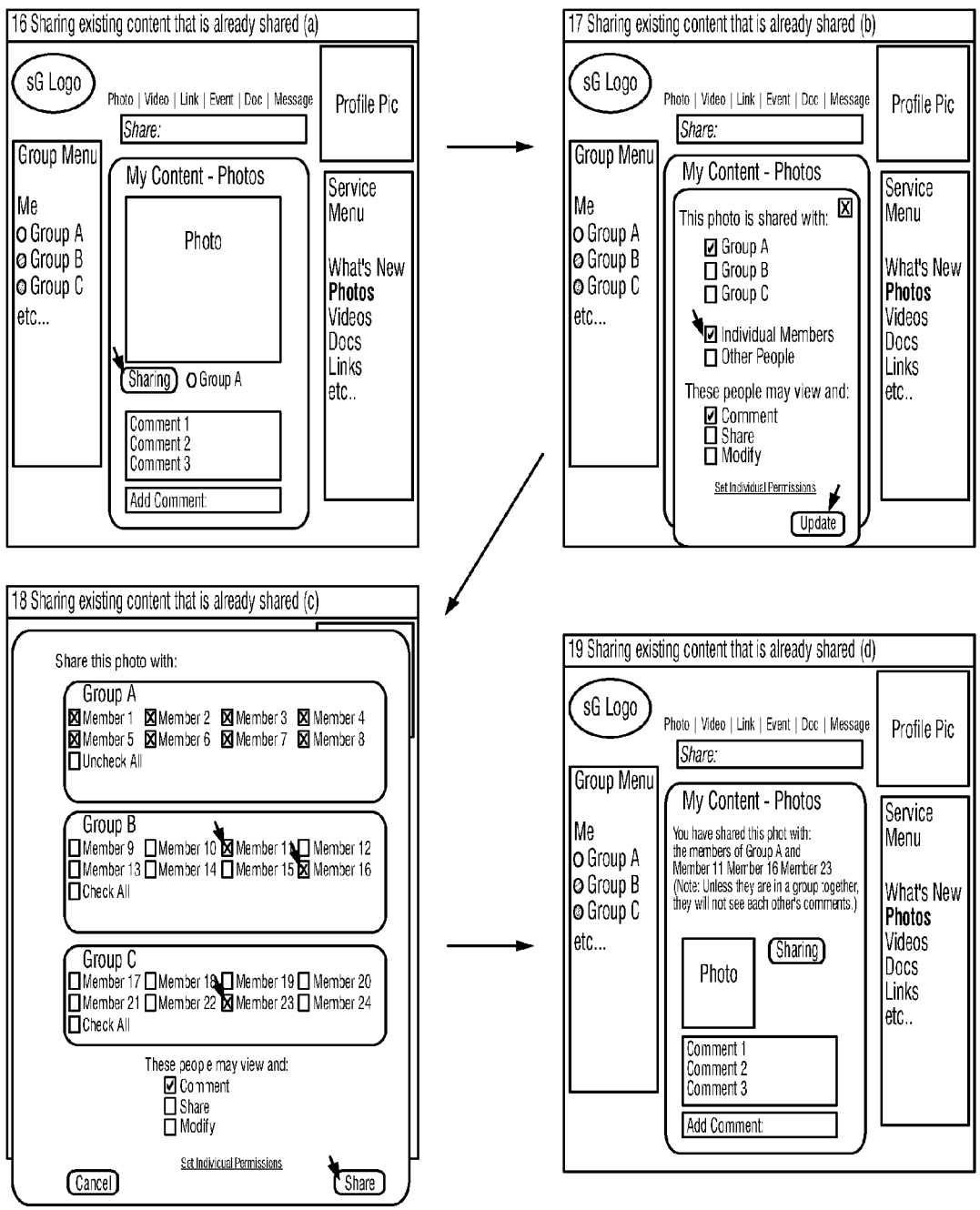
FIG. 5 illustrates sharing existing content that is already shared.
Figure 6:
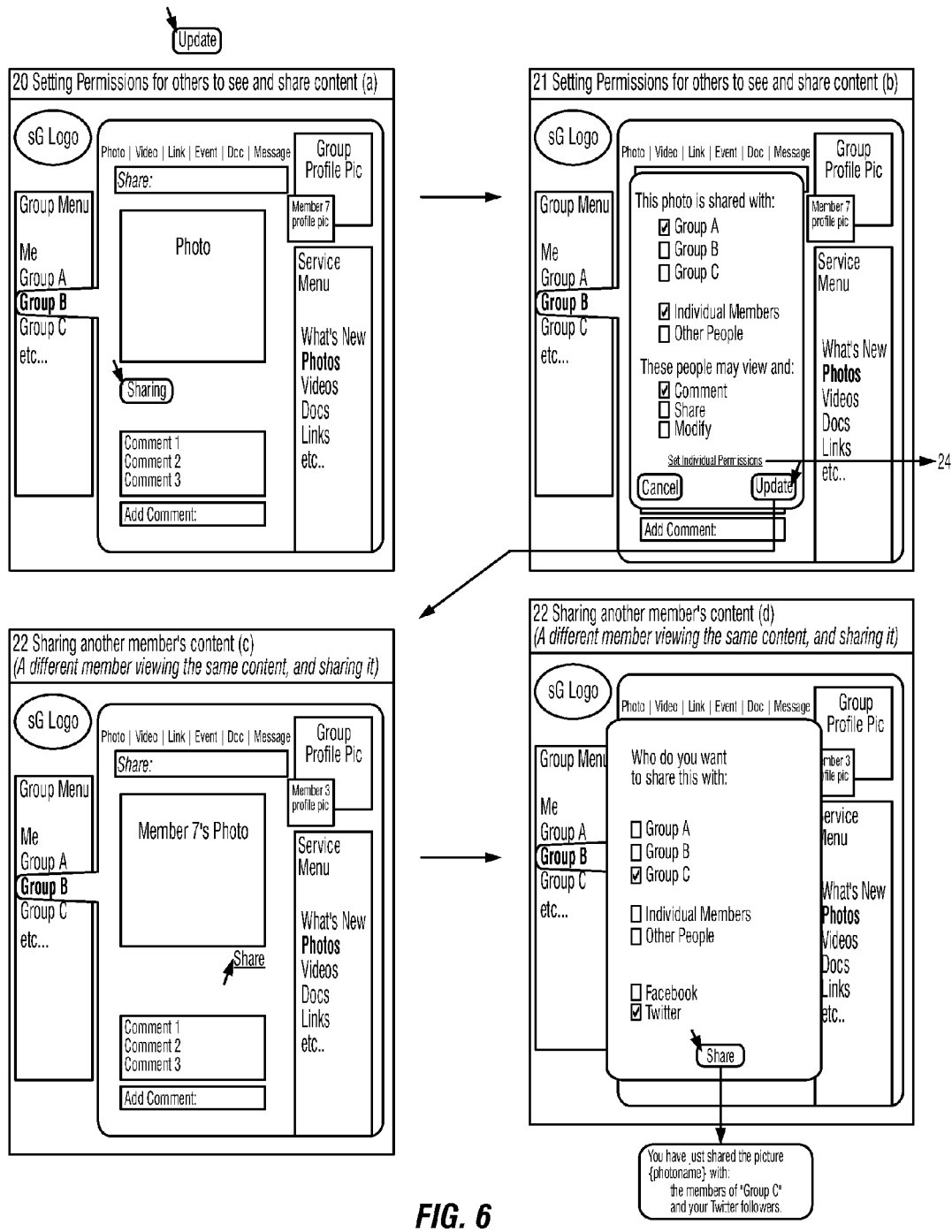
FIG. 6 illustrates setting permissions for others to see and share content.
Figure 7:
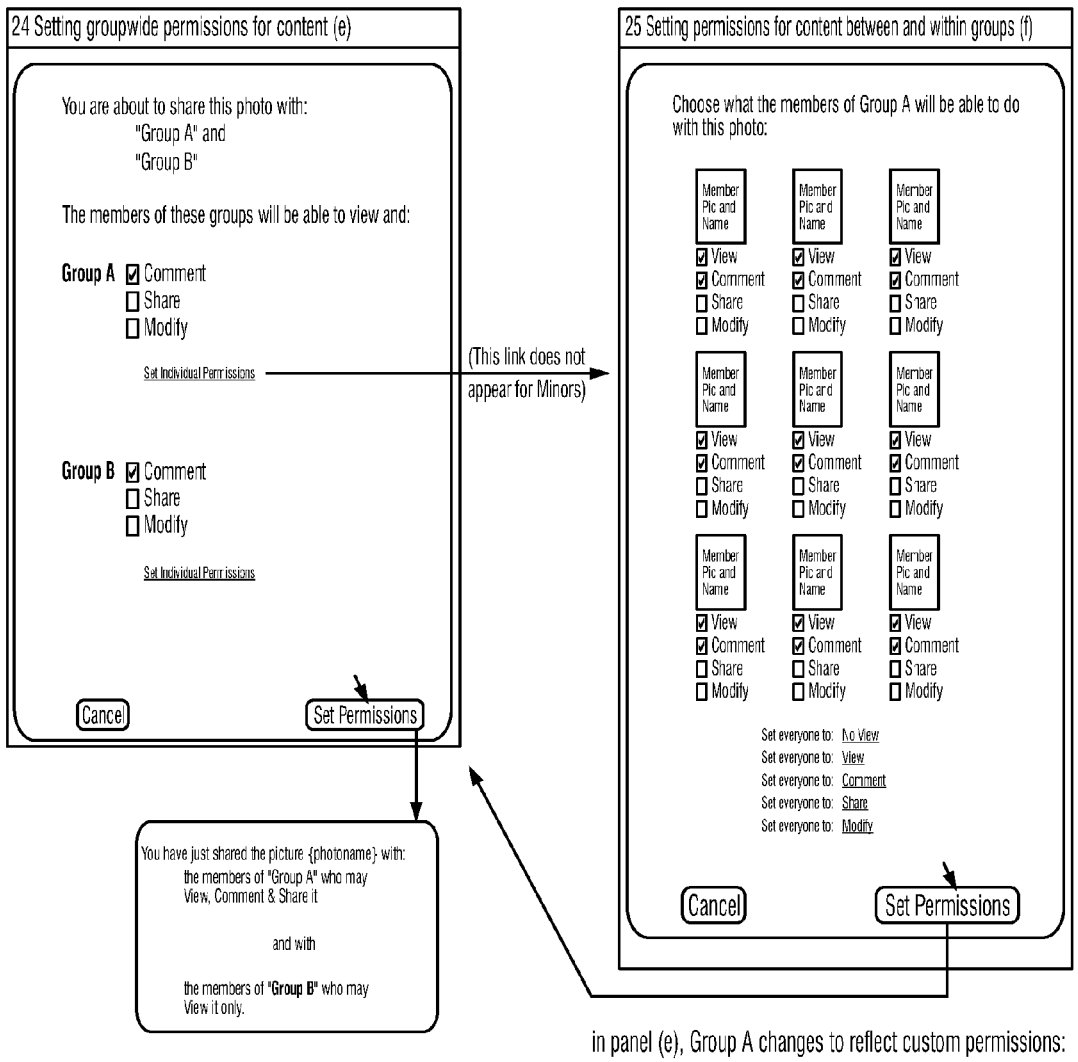
FIG. 7 illustrates setting groupwide permissions for content and setting permissions for content between and within groups.
Figure 8:
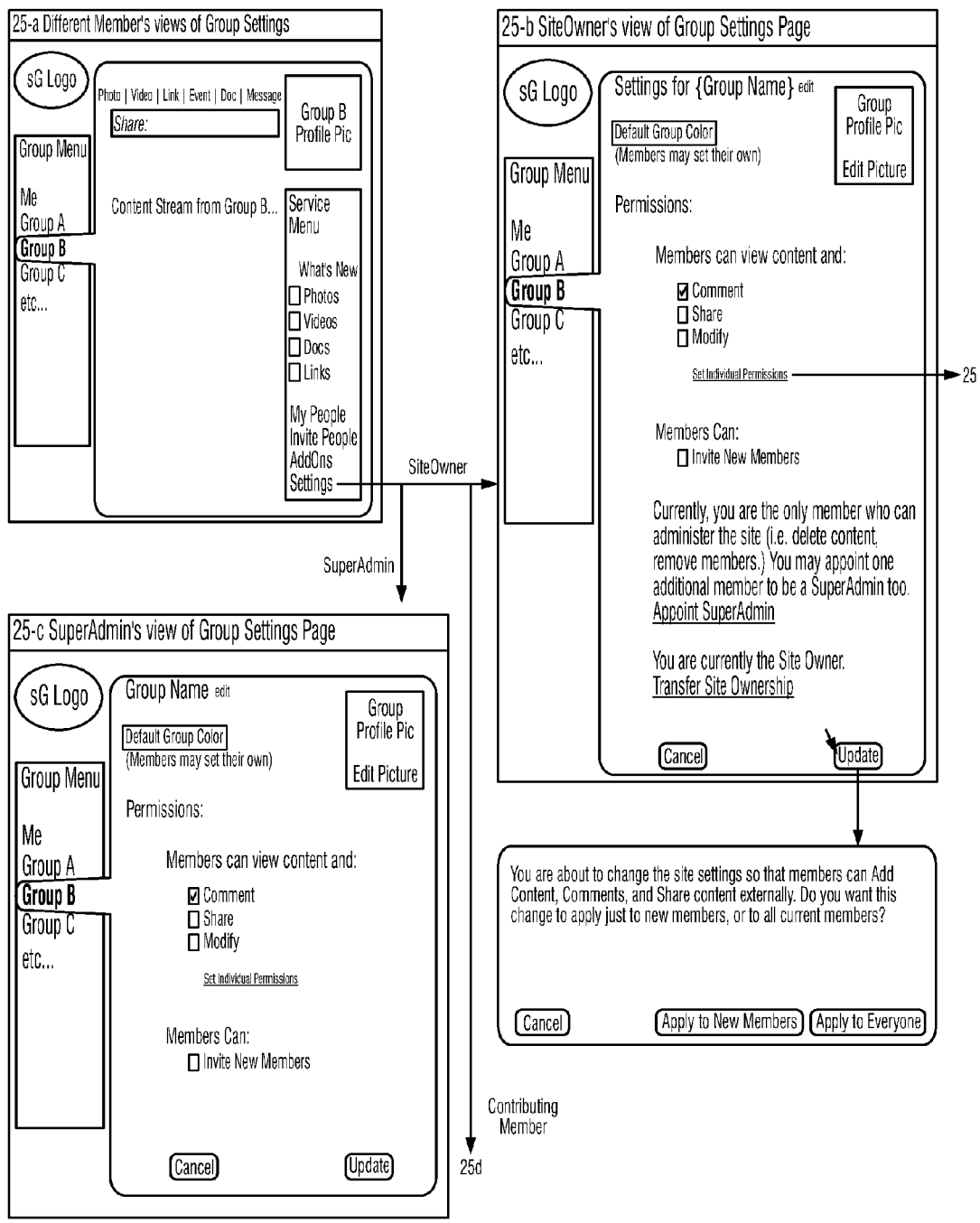
FIG. 8 illustrates three types of group settings page views.
Figure 10:
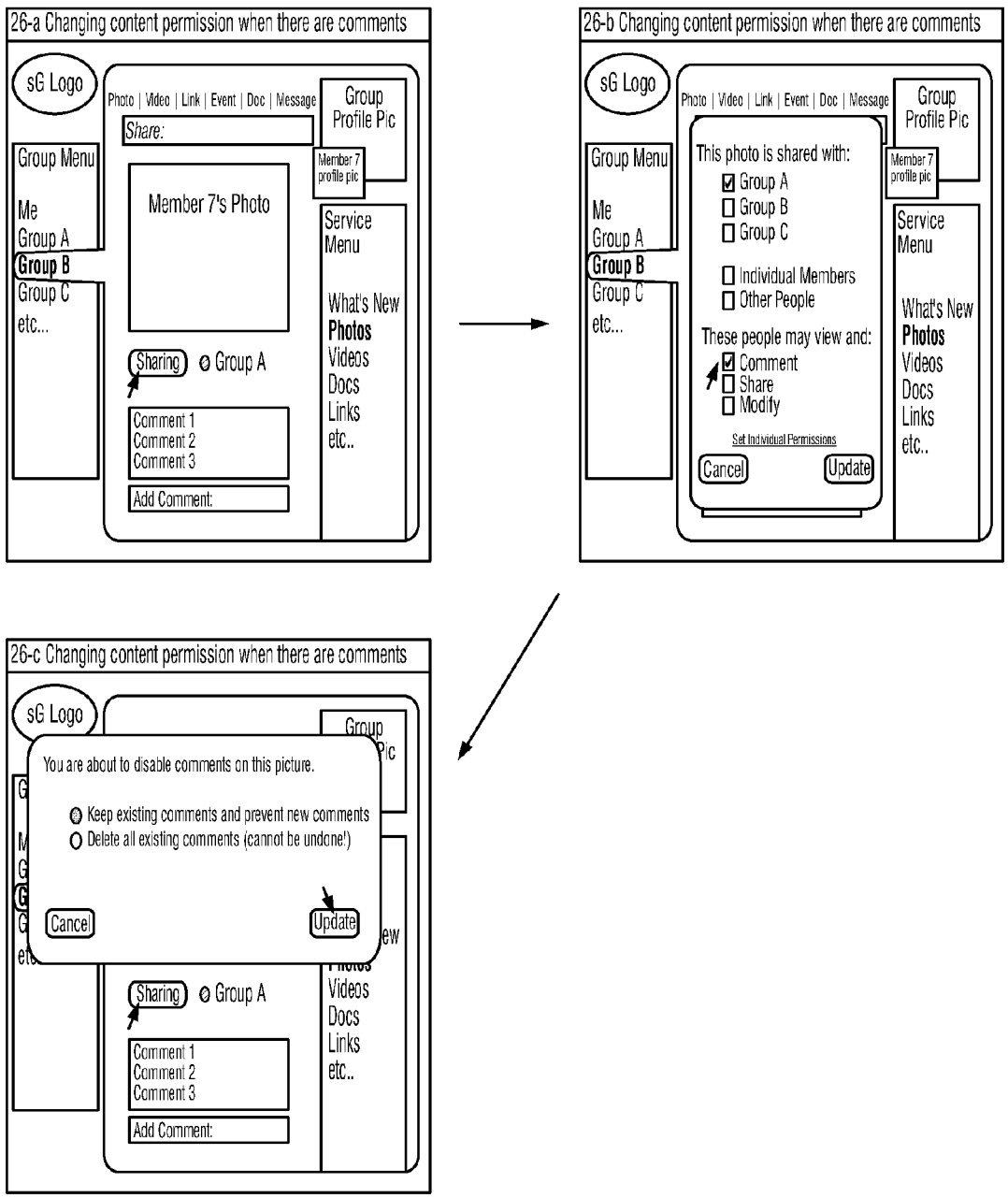
FIG. 10 illustrates changing content permissions when comments are present.

The methods, apparatuses, and computer software of the present invention ("GroupAuth") provide each individual user of an online resource (including social media accounts, financial management accounts, file backup and storage accounts, etc.) the ability to maintain ownership and control over their content, and enables them to easily share any piece of {information/resources/content} (e.g., text, photo, video, link, etc.) with a single person, ad-hoc groups of individuals, an organized group, or multiple groups of people (private or public) in unique and unprecedented ways.

GroupAuth provides for an individual owner of content to share and allow access and permissions to both individual group members and/or entire groups to see content that has been shared with that group by the content owner. Users may belong to none, a few, or multiple groups, and GroupAuth lets a user easily share their information with individual members, as well as one or multiple groups, and specify what each group and/or individual member may do with that information the content owner shares (read, modify, add, delete, etc.).

In GroupAuth, when a user shares a piece of their content with one or more group(s) or individual(s), the content belongs only to that user, and every authorized individual/group member can access it, but the content always remains only owned by the user, and the user can easily remove it or change access permissions, etc., from any or all groups/individuals at any time.

In the user viewing experience of the GroupAuth service, each individual member has a unique view of every single piece of content they have access and permission to experience: When a content owner/user shares a piece of their content with multiple groups or individuals, and other users who are able to view that content and have permissions to do so, then add comments or additional content to the user's original content, each viewer may see a different view of the comments or additional content associated with the original content, based on their individual group memberships and access and permission levels.

A member's view of a single piece of shared content is determined by a variety of factors that create their unique view:

Group Membership

Permissions assigned by group leader

Permission levels chosen by content owner for individuals/group members

The viewer's choices about what to see and what not to see from what they have permission to see.

Unique settings selected by the viewer, including color choices, etc.

For example, suppose a user is in two groups, say A and B. She wants to share a picture with both. Comments made by members of A are not seen by members of B who are not members of A. Members belonging to both A and B can see both sets of comments. An individual or member of one group may be able to see the content, but not add to, edit, modify or delete it based on their access type for the given resource.

In the user experience of GroupAuth, each individual member also has a unique view of combined content. GroupAuth allows a user to see a unique view of combined of content that is the aggregate of the content of any or all of the groups they belong to, and/or it lets them focus in to view the content of a distinct group they belong to, and/or it lets them see the content shared by specific members of any of their groups, and/or it lets them view content of a specific type (e.g., photo, video, document, etc).

A user's unique combined content view is created by:

Any combination of types of group content

Any combination of groups they are members of

Any combination of individual members in their groups

Any content shared with them by any of their contacts

Any combination of content from external websites, cloud or mobile, sources

Access and permission levels

Unique settings selected by the viewer, including color choices, etc.

The user can also select to view and act upon just their own content that they have shared with their groups.

The user can also choose to view and act upon only their owned content that is fully private, i.e., unshared.

The user can filter, query and sort any content they view, giving them full control to search based on group, user, creation date, content type, keyword, tags, etc.

The user can easily see who any of their owned content/resources are being shared with, and change the authorized audience as well as the permissions of the authorized audience at any time.

GroupAuth provides a customized view for each user to see only the elements of the content they have permission to see. These permissions are contingent upon their membership in an authorized group, and the original poster's enabling them to read, modify or delete the content. Each user can customize their own view of the content they are authorized to see, by further filters for user or content type.

A content owner/user initiates a GroupAuth service interaction by sharing a piece of their owned content, with a group, groups, and/or selected individual(s). Now, the users with requisite access and permissions may then share comments and additional pieces of content inspired by the first posting.

Content can also be shared with selected members (subsets) of a group or groups, and in this case, GroupAuth provides a means to dynamically assemble these people into a new group based around that piece of content. This new group takes on a life of its own, and any member can then add other types of content to that group environment, or invite other members.

For example: a user chooses to share a photo with a member of group A, a member of group B and someone who is not yet a member of the service. These individuals can easily add comments or further content that is automatically shared with the same set of users, thereby creating a new group, C, that shares access to the same content.

GroupAuth provides the ability for a user to confidently control who can see, edit, delete and comment, share, etc. to the content they own, and to change these controls, authorizations and access types at any time.

The user has the ability to upload content that they do not share (i.e., it remains completely private). Then they may at any point share it with their groups, or share it with individuals, thereby creating new dynamic groups. At all times the user owns their content.

The user who owns a piece of content may change the controls, authorizations and access types for an entire group, or for specific members of that group.

At any time, the owner of a piece of content may remove that content from one group, all groups, any authorized individuals, or delete it from their personal area entirely.

A user can also share content with specific individuals who are not yet members of the site, in which case they receive a notification of the shared content and the existence of the new group, together with an invitation to join the site and contribute to the conversation. This leads to the following aspects of the present invention.

Dynamic Group Creation Based On Content Sharing.

GroupAuth allows a new group to be dynamically created based on a shared piece of content. When a user chooses to share a piece of content with selected individuals who may belong to other groups or who may not yet be part of the service, this creates a new group with its own identity, and any member can then add other types of content to that group environment, and the group may grow to include other members. By contrast, other services start by creating a group, inviting members, and allowing members to share content.

Special Permission Sharing.

GroupAuth allows a user to share not just their own content, but in certain specific instances, they can share content that belongs to the entire group with selected third parties. For instance, the invention allows a user to print a group photo album through a third party photofinisher.

Importing Content.

GroupAuth allows a user to import content from websites, cloud or mobile, sources, and then specify which of their internal groups and individual members they share that content with, and choose the access levels associated with that content at the group or individual level. The sharing of this content is managed through the GroupAuth service.

Importing Contacts.

GroupAuth allows a user to import contacts from websites, cloud or mobile, sources, and specify which of their groups those new members will belong to, and choose the access levels and permissions for those new members. The integration of these new members is managed by the GroupAuth service.

Inviting New Members.

GroupAuth allows a user to invite new members who are members of an external website, mobile, or cloud service, into a group through a unique integrated invitation process. GroupAuth sends a custom direct message to the invitee, and an authorization method or mechanism is used to capture information about the invited user, which may include name, login, profile photo, etc. A link is included with the direct message, and the invitee follows the link, and GroupAuth authenticates them via an authentication mechanism and provides the invitee access and permissions to the group(s) the invitee was invited to join. The integration of this new member is managed by the GroupAuth service.

Levels of Permission.

A group member's view of shared content determined by a variety of factors that create their unique view: (1) Group Membership; (2) Permissions assigned by group leader; (3) Permission levels chosen by content owner for individuals/group members; (4) The viewer's choices about what to see and what not to see from what they have permission to see; and (5) Unique settings selected by the viewer, including color choices, etc.

In short, the present invention provides at least the following benefits and advantages as illustrated by the indicated Figures:

1. GroupAuth allows a user to authorize multiple groups or individuals simultaneous access to that user's content with varying levels of permissions, while the content owner retains full ownership and control over their content. See FIGS. 1-2 and 5-10.

2. In GroupAuth, when a user shares a piece of their content with one or more group(s) or individual(s), it belongs only to that user, and every authorized individual/group member can access it, but it still only owned by the user. The content owner/user can easily see who any of their owned content/resources are being shared with, and change the authorized audience as well as the permissions of the authorized audience at any time. The user can easily remove their shared content or change access permissions, etc., from any or all groups/individuals at any time. See FIGS. 1-10.

3. The invention provides a unique view of single piece of content—when a user shares a piece of their content with multiple groups or individuals, and other users add comments or additional content to the user's original content, each viewer may see a different view of the comments or additional content associated with the original content, based on their individual group memberships and access and permission levels. A group member's view of a piece of shared content is determined by a variety of factors that create their unique view:

Group Membership

Permissions assigned by group leader

Permission levels chosen by content owner for individuals/group members

The viewer's choices about what to see and what not to see from what they have permission to see.

Unique settings selected by the viewer, including color choices, etc.

Figure 11:
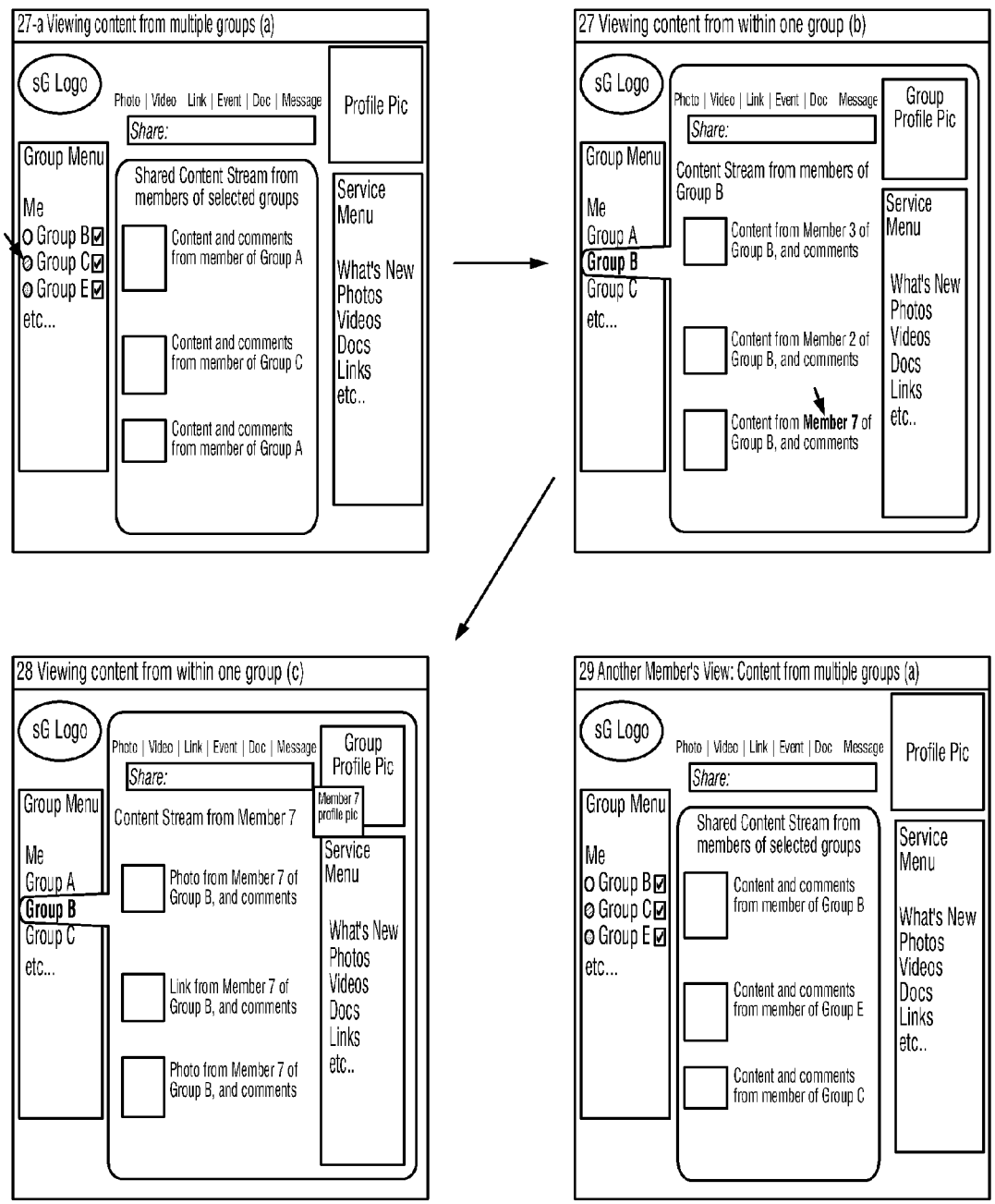
FIG. 11 illustrates viewing content from one or more groups.

4. The invention provides a unique view of combined content—GroupAuth allows a user to see a unique view of combined of content that is the aggregate of any or all of the groups they belong to, and/or it lets them focus in to view the content of a distinct group they belong to, and/or it lets them see the content shared by specific members of any of their groups. See FIG. 11. A user's unique combined content view is created by:

Any combination of types of group content

Any combination of groups they are members of

Any combination of individual members in their groups

Any combination of content from external websites, cloud or mobile, sources

Access and permission levels

Unique settings selected by the viewer, including color choices, etc.

Figure 12:
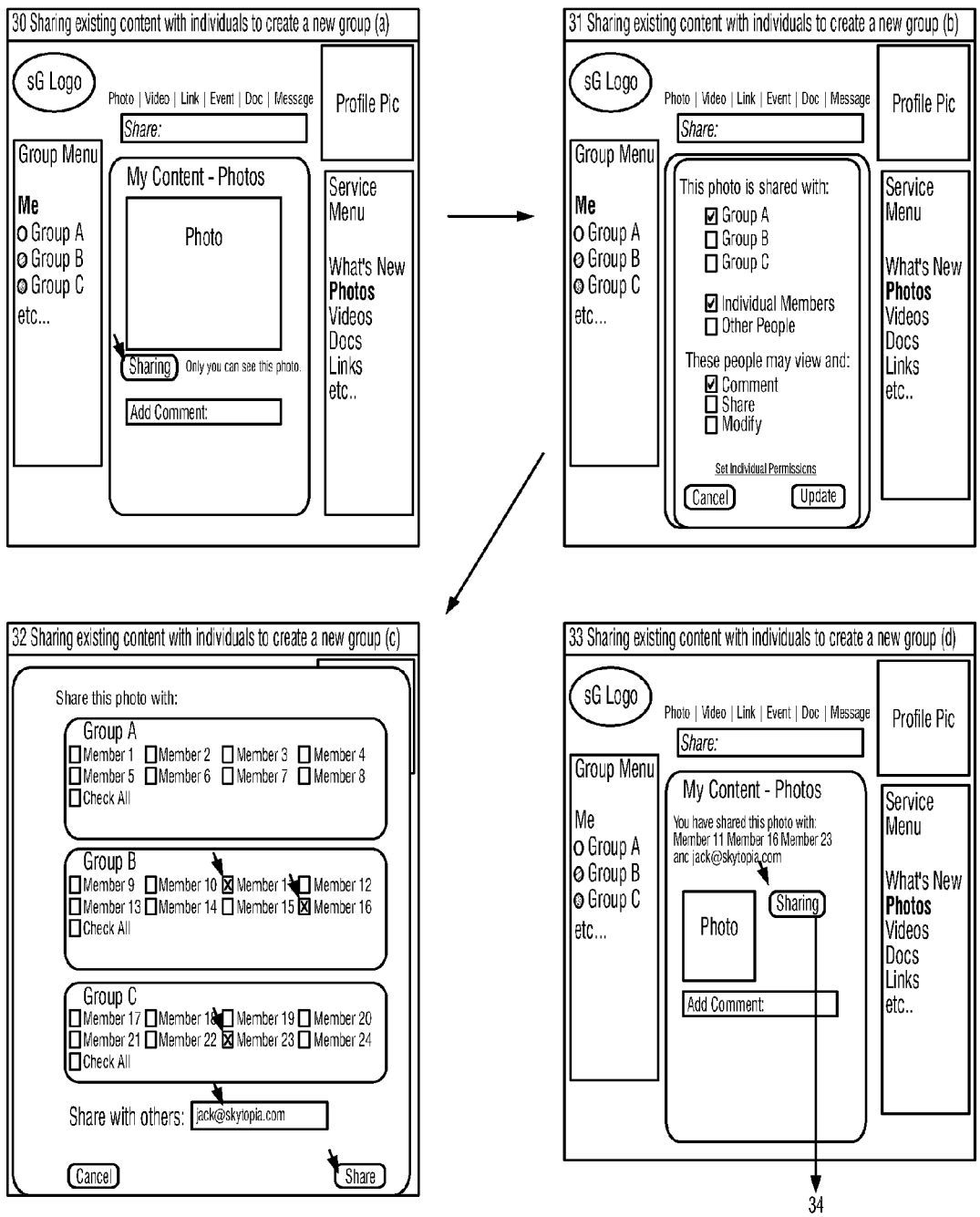
FIG. 12 illustrates sharing existing content with individuals to create a new group.
Figure 13:
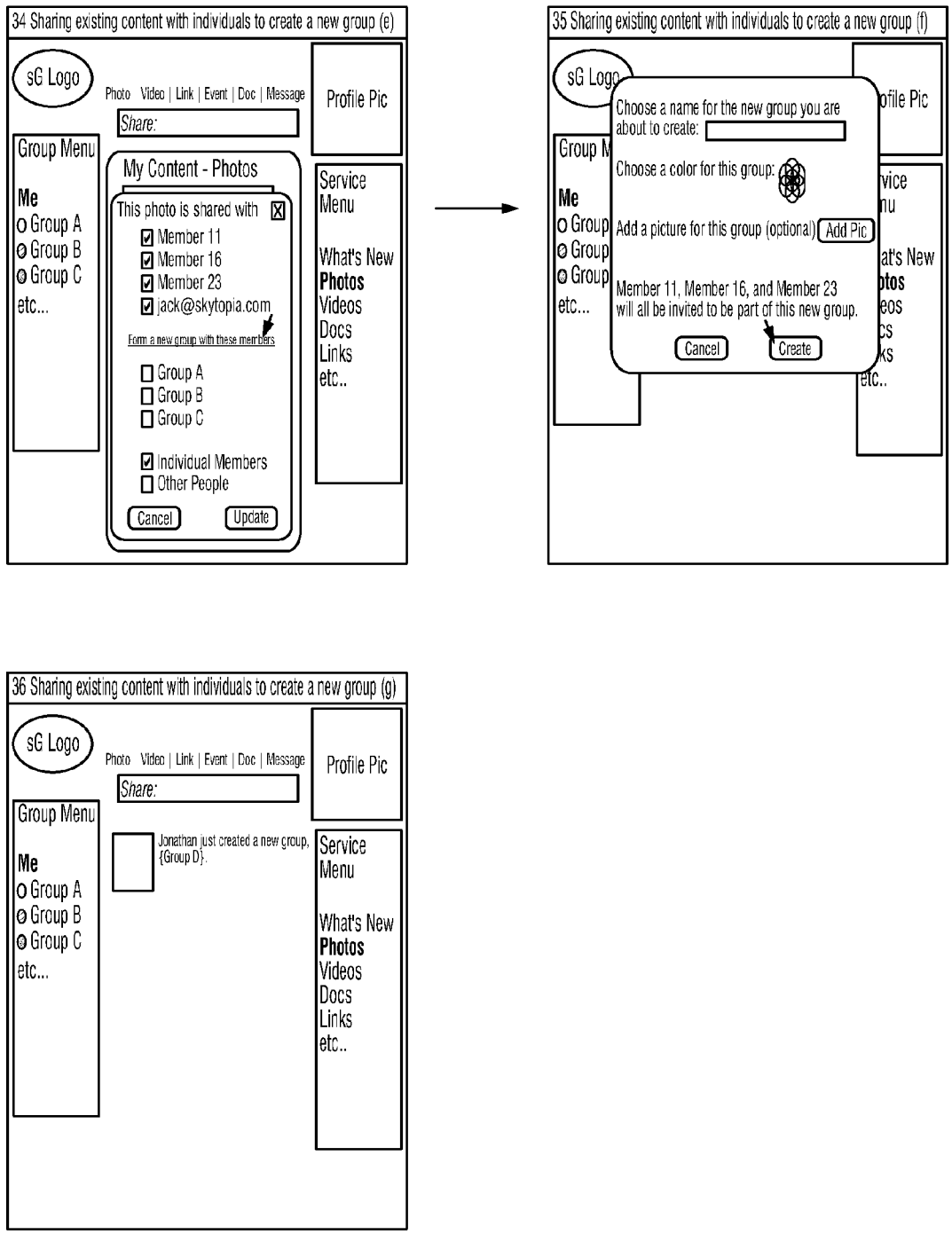
FIG. 13 further illustrates sharing existing content with individuals to create a new group.

5. GroupAuth allows a new group to be dynamically created based on a shared piece of content. When a user chooses to share a piece of content with selected individuals who may belong to other groups or who may not yet be part of the service, this creates a new group with its own identity, and any member can then add other types of content to that group environment, and the group may grow to include other members. Other services start by creating a group, inviting members, and allowing members to share content. See FIGS. 12-13.

Figure 14:
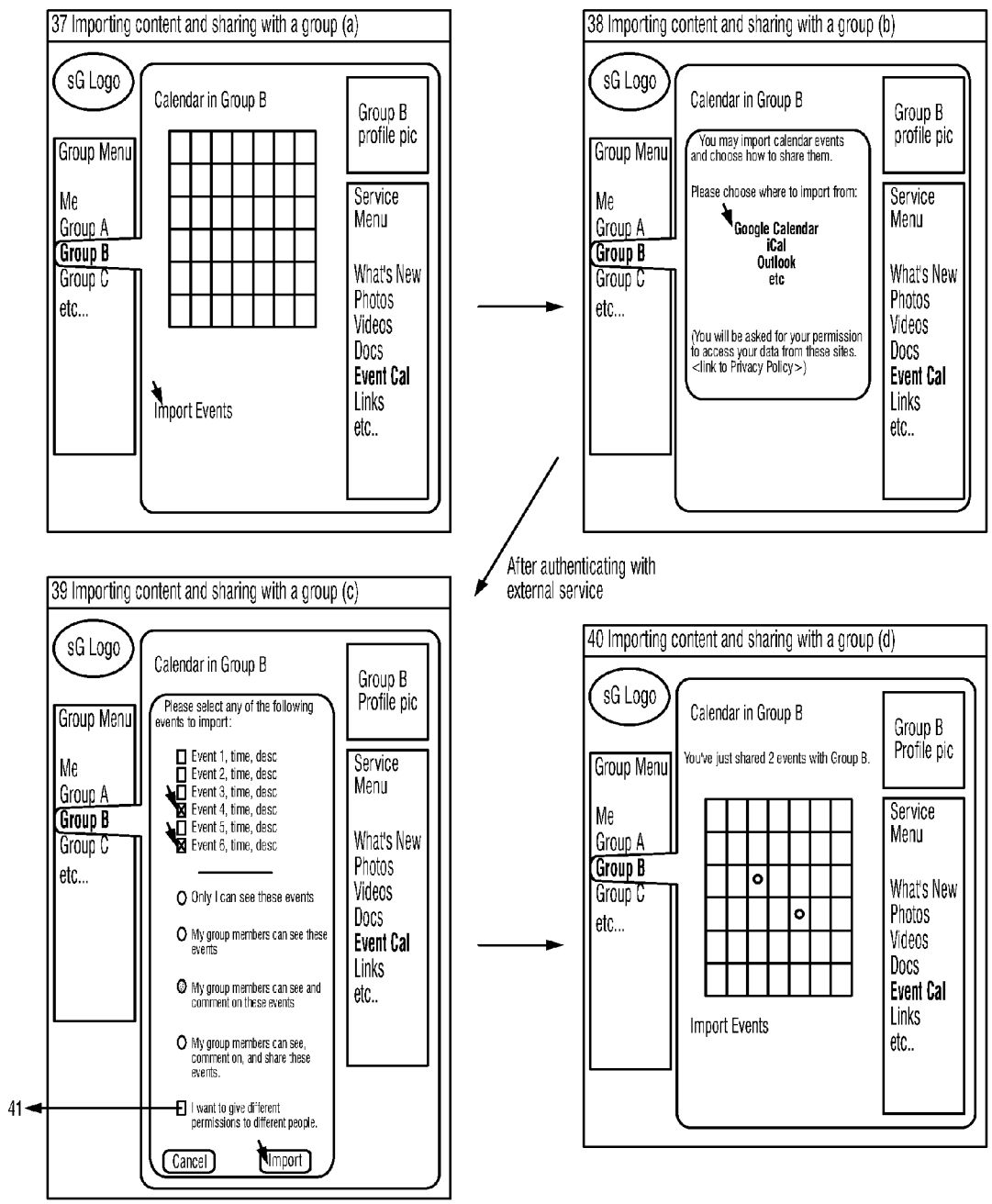
FIG. 14 illustrates importing content and sharing with a group.
Figure 15:
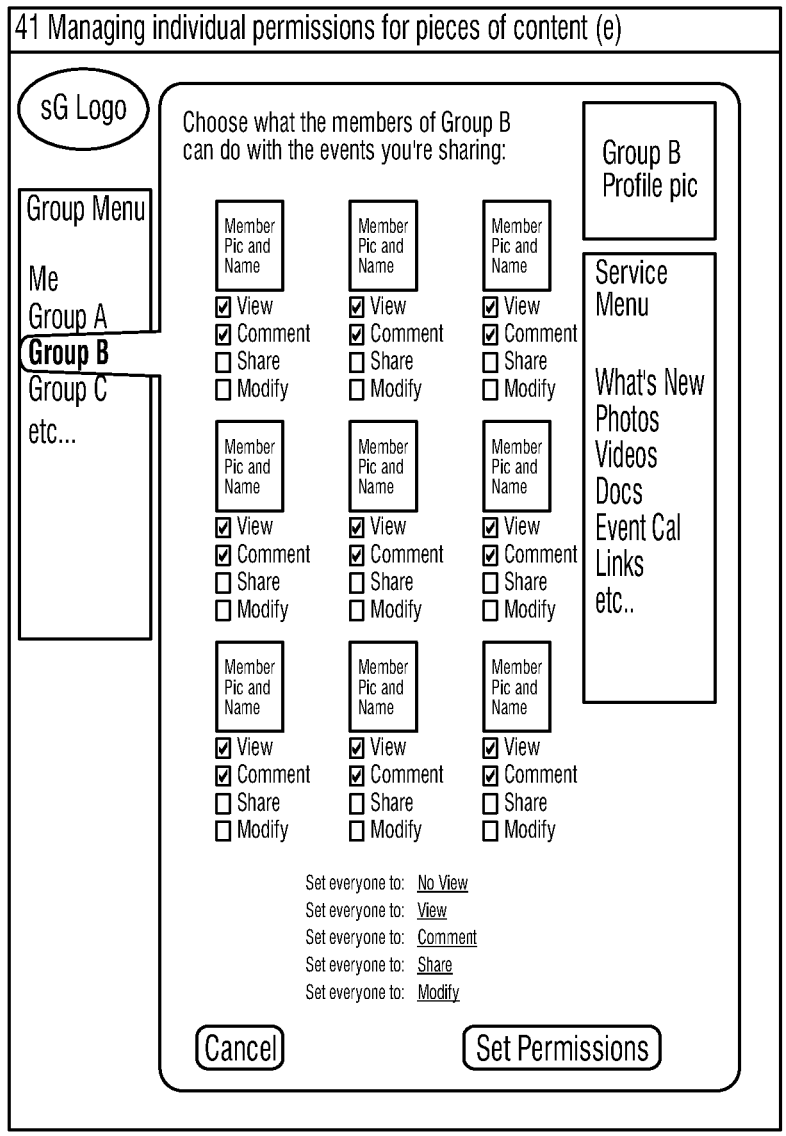
FIG. 15 illustrates managing individual permissions for pieces of content.

6. GroupAuth allows a user to import content from websites, cloud or mobile, sources, and then specify which of their internal groups and individual members they share that content with, and choose the access levels associated with that content at the group or individual level. The sharing of this content is managed through the GroupAuth service. See FIGS. 14-15.

Figure 16:
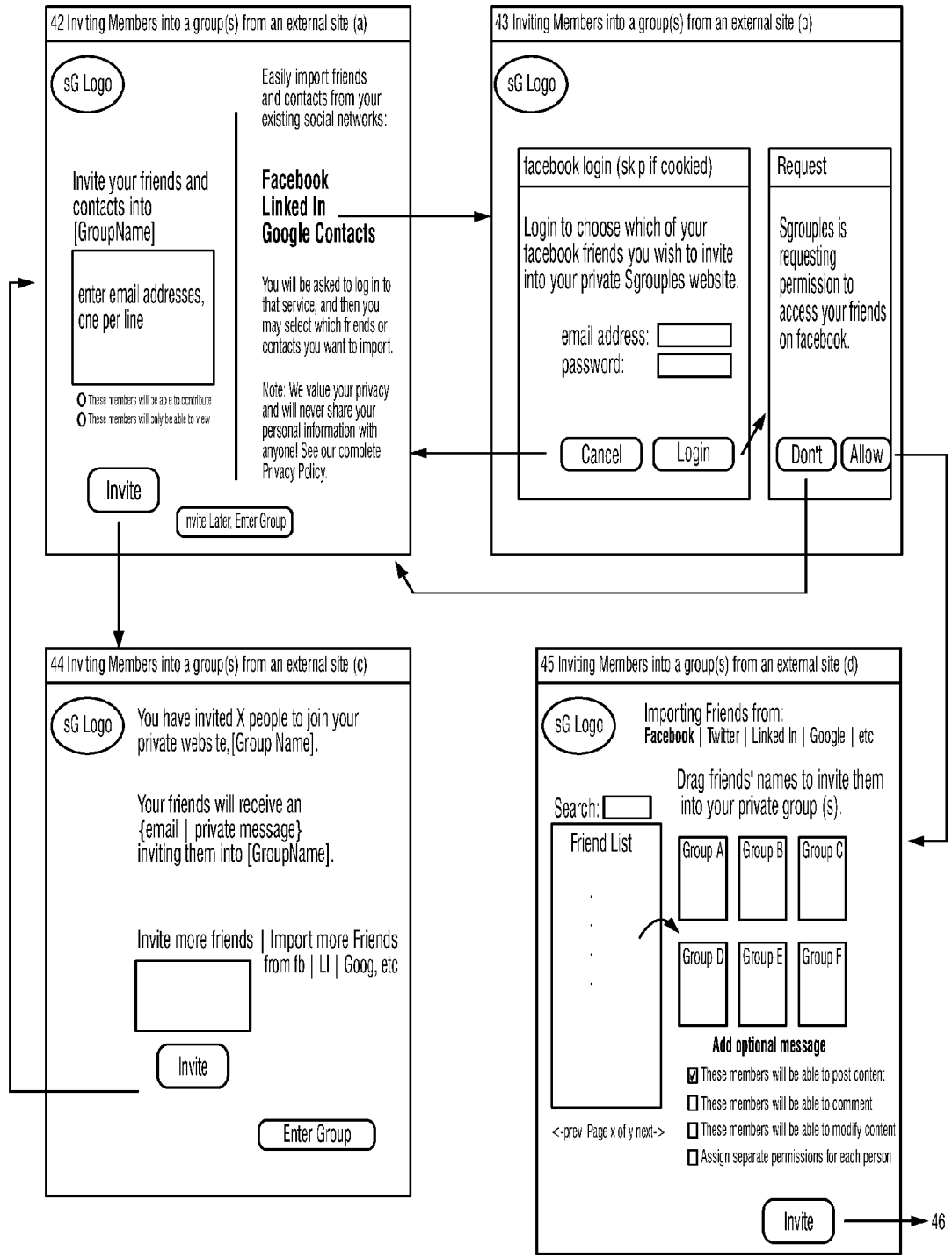
FIG. 16 illustrates inviting members into a group or groups from an external site.

7. GroupAuth allows a user to import contacts from websites, cloud or mobile, sources, and specify which of their groups those new members will belong to, and choose the access levels and permissions for those new members. The integration of these new members is managed by the unique permissions and interaction of the GroupAuth service. See FIGS. 16-17.

Figure 18:
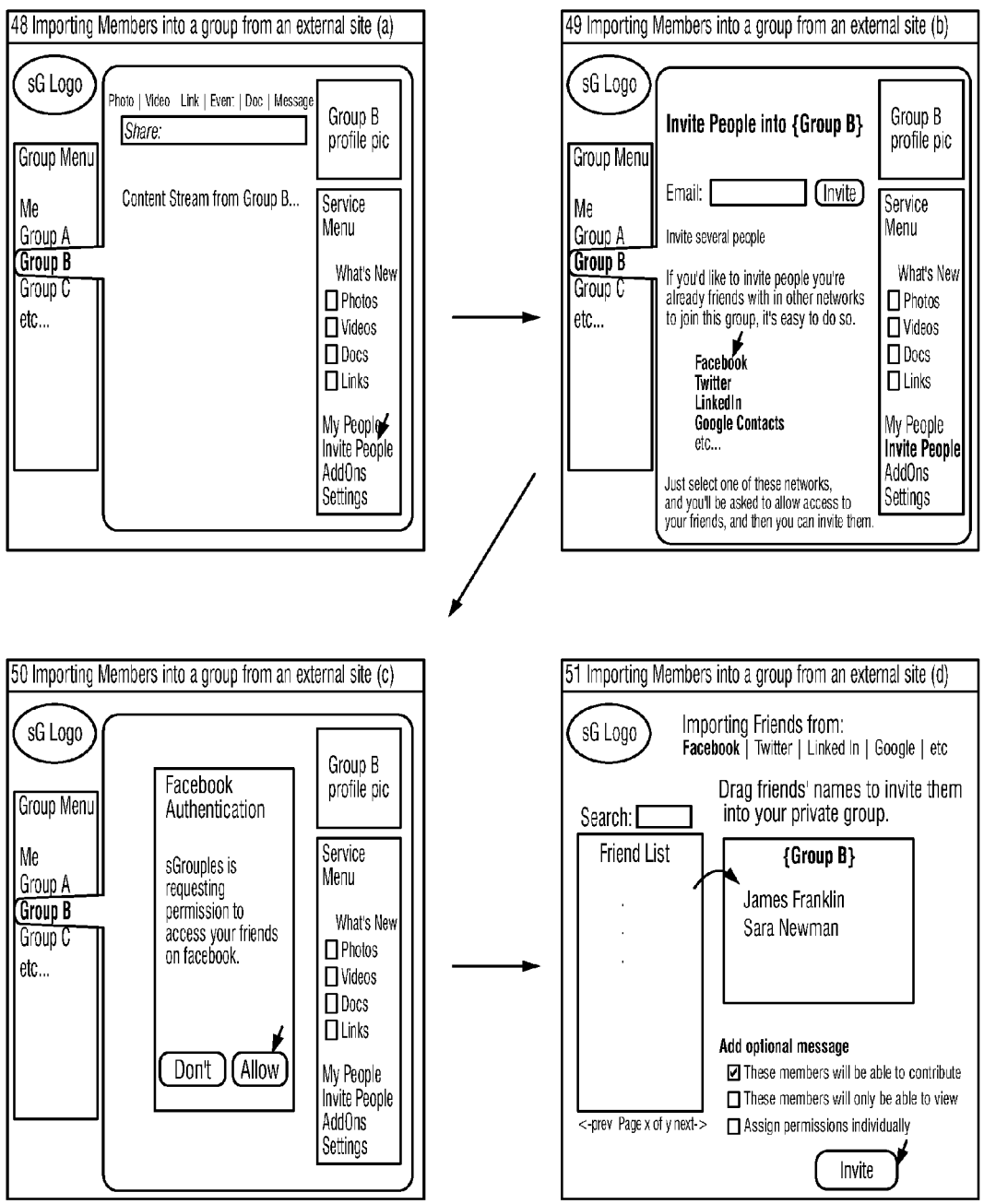
FIG. 18 illustrates importing members into a group from an external site.
Figure 19:
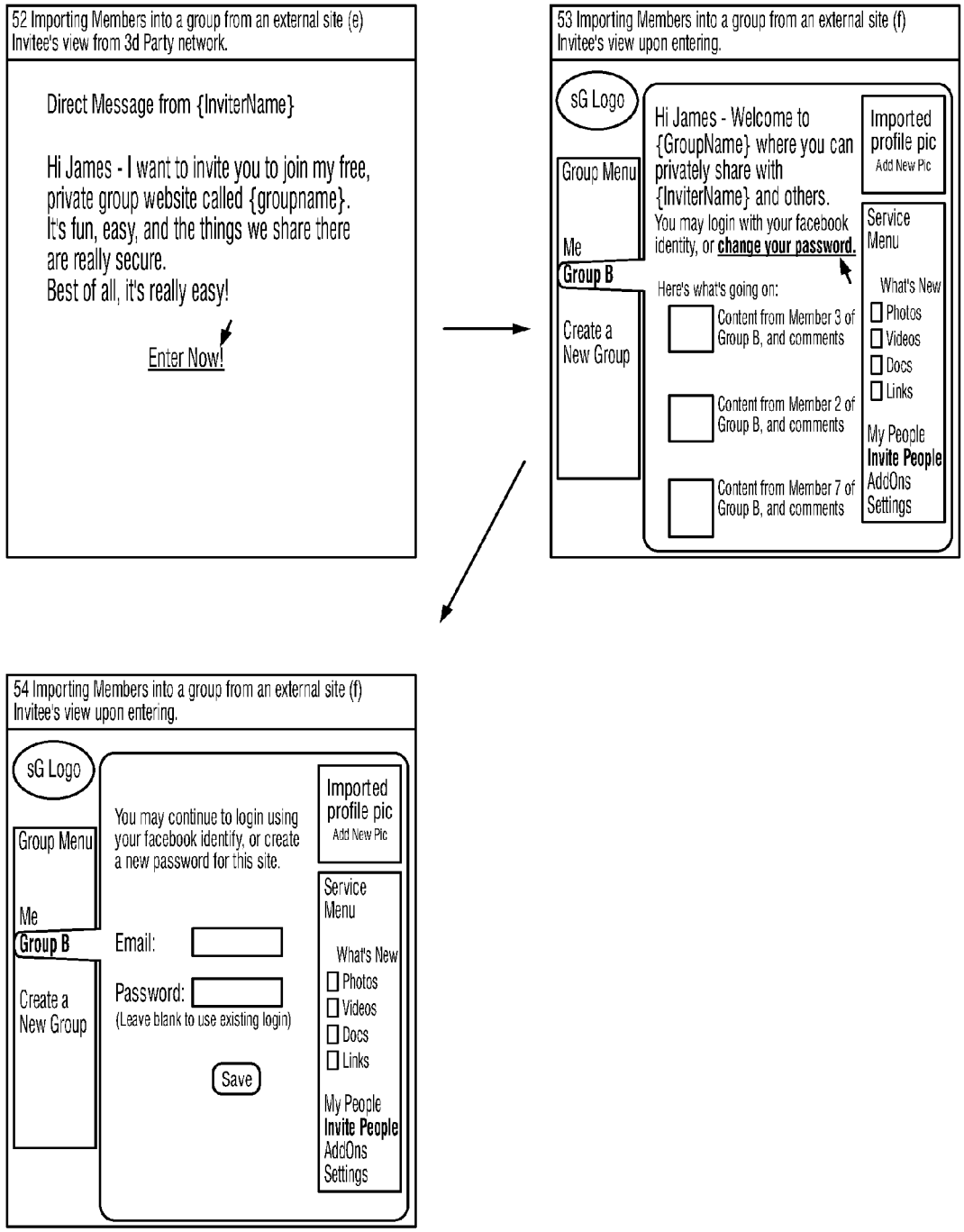
FIG. 19 further illustrates importing members into a group from an external site.

8. GroupAuth allows a user to invite new members who are members of an external website, mobile, or cloud service, into a group through a unique integrated invitation process. GroupAuth sends a custom direct message to the invitee, and an authorization method or mechanism is used to capture information about the invited user, which may include name, login, profile photo, etc. A link is included with the direct message, and the invitee follows the link, and GroupAuth authenticates them via an authentication mechanism and provides the invitee access and permissions to the group(s) the invitee was invited to join. The integration of this new member is managed by the GroupAuth service. See FIGS. 18-19.

Figure 20:
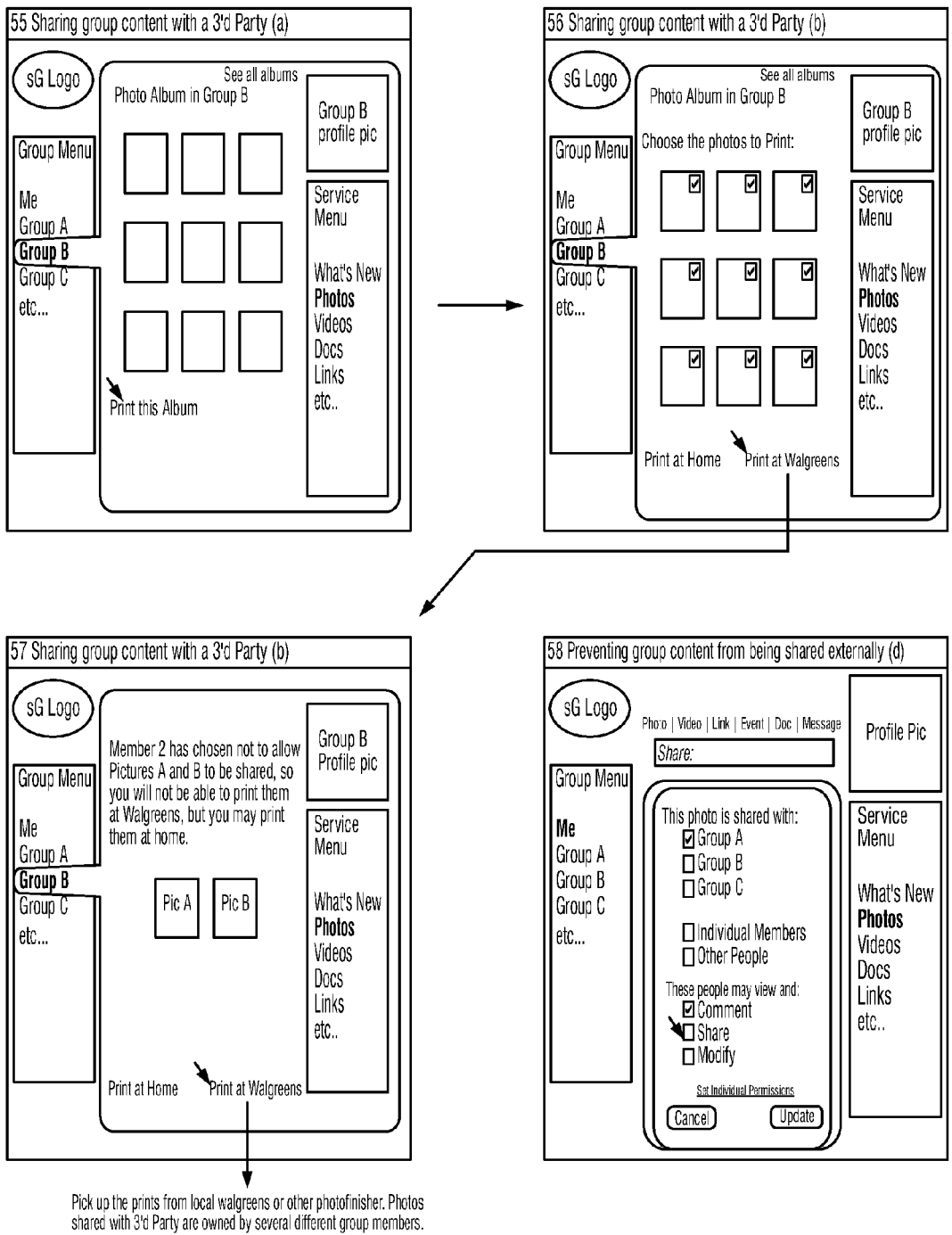
FIG. 20 illustrates sharing group content with a third party.
Figure 21:
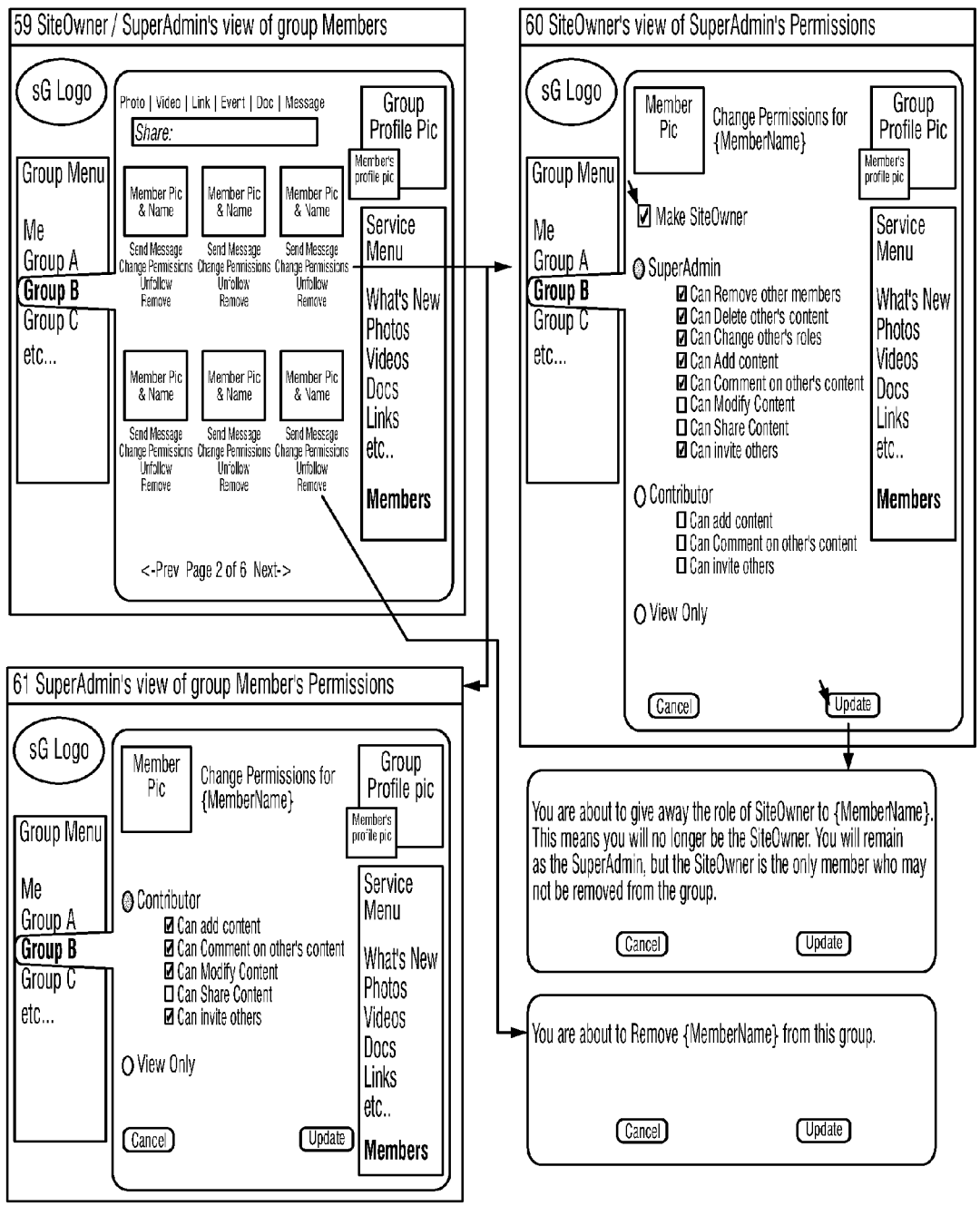
FIG. 21 illustrates SiteOwner's and SuperAdmin's management screens.
Figure 22:
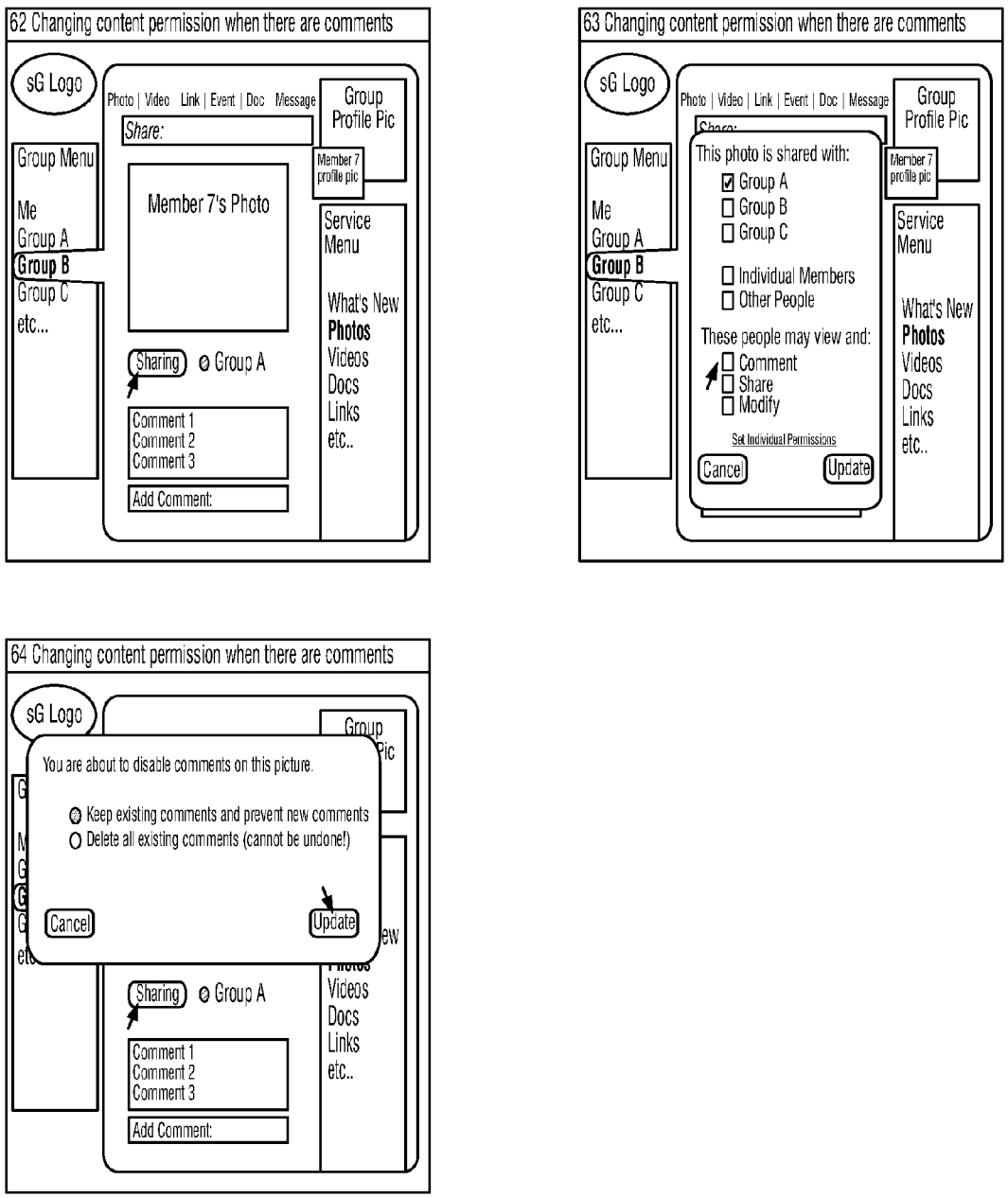
FIG. 22 illustrates changing content permissions when there are comments present.

9. GroupAuth allows a user to share not just their own content, but in certain specific instances, based on the unique permissions of the GroupAuth service, an individual user can share content that belongs to the entire group with selected third parties. For instance, allowing a user to print a group photo album through a third party photofinisher. See FIG. 20.

10. GroupAuth provides a unique pallet of possible permissions specifications, with concomitant unique flexibility. More details on the preferred pallet foil next. See FIGS. 21-22 and 28-31.

For Content: (CCVMSOD).
The following permissions preferably apply to content:
Create Content (member can create/add/post content: member sets "Content Permissions" on their content; member can delete comments on their content; and member can delete their own content.)
Comment on Content (member can comment on theirs and other members' content if the content allows comments)
View Content (permission to view content)
Modify Content (based on content type, a member may be able to modify or change another member's content if that content is modifiable. In general, any contributing member may edit any content they own, but nobody may edit or modify another member's content, not even the SiteOwner or SuperAdmin.)
Share Content (When "Share" permitted, a member who does not own the resource, and who has permissions to share, can share the resource as they please with another group, individuals, outside of the online service, etc., and once the member shares the resource, then that resource also resides in their personal content area)
Own Content (members own their content and based on permissions they select, can allow ownership of their content by other members and/or the groups they belong to)
Delete Content (based on granted permissions, members can delete other members' content)

For Membership: (IRCUPSG).
The following permissions preferably apply to membership:
Invite new members (when inviting new members, permissions for new members are based on existing permissions of the member who is inviting. New members cannot be assigned permissions and roles higher or more extensive than the member who is doing the inviting, except in the case of a minor inviting someone who is not a minor—in that case the minor may assign the new member up to the level of Contributor.)
Remove members
Change Roles Permissions of Members
Unfollow Other Members
Purchase Premium Services for Group or Personal Area
Shut Down Group (Site Owner only)
Group Creation
User Roles.

The following Roles have a set of default permissions, any of which can be modified by SiteOwner or SuperAdmin (SO/SA). During the invitation process as well as at any time, the default permissions granted can be modified by checking/unchecking specific permissions and/or by changing the role of a member.

There can be Contributors, Viewers, and Minors in any group, but preferably only one SiteOwner and 1 or 0 SuperAdmins. Another way to define the roles is to have "Contributor" "Limited" and "Viewer" roles, which simplifies the user interface, such that "Limited" role always has the "Approval Required" permission enabled.

There is only one SiteOwner per group, and that role by default is given to the creator of the group. They may, if they wish, delegate authority to a SuperAdmin, but they retain SiteOwnership and cannot be removed by the SuperAdmin or have their content deleted.

SiteOwner (SO).
The following permissions are granted to a SiteOwner:
Content: CCVOMSD
Membership: IRCUPSG
There preferably is one and only one SO, though circumstances may at times allow the creation of more than one. The SO's content cannot be deleted by any other group member, not even by the SuperAdmin. This is the only Member who can assign the group's SuperAdmin (SA), transfer Site Ownership, and/or delete the group. If the SO transfers ownership of the group to another member, then the now "former" SO is subject to the rules and permissions based on the new Role they have taken or been assigned by either their replacement (SO), or by the SA.

SuperAdmin (SA).
The following permissions are granted to a SuperAdmin:
Content: CCVOMSD
Membership: IRCUPG
SuperAdmin has all the powers of SiteOwner except that they cannot remove the SO, delete the SO's content, or eliminate the group.

Contributor.
The following permissions are granted to a Contributor:
Content: CCVOMS
Membership: IPUG
A Contributor by default has many privileges which may be modified by the inviter or by the SA or SO.

Viewer.
The following permissions are granted to a Viewer:
Content: V [S—Unchecked and Optional]
Members: IG [P—Unchecked and Optional]
Viewers by default can View and also Invite Members and Start Groups, who will automatically have the same ROLE level-Viewers. Like all permissions, the "Invite Members" can be unchecked; if so then Viewers can only View Content.

Minor.

The following permissions are preferably granted with respect to a Minor (although this may vary by jurisdiction specific legal requirements, etc.):

Content: C*CVOMS
Membership: I

*Preferably Minors have fixed "Content Permissions", which are "View/Comment"

Young persons 12 and under are denominated as Minors. A member who starts out as a Minor does not automatically become a regular member when they turn 13. When a minor reaches their 13th birthday, preferably an auto-email is sent to the SiteOwner and SuperAdmin letting them know, and offering them a one click option to upgrade the minor to full powers, allowing them full Contributor powers, potentially including the ability to unfollow other members (e.g., parents). The SO/SA can upgrade a minor to regular Contributor anytime after their 13th birthday.

Minors may set group-wide permissions for the content they post, but they may NOT specify individual permissions for various members to access th content, i.e., they may not exclude anyone from seeing their content.

Minor is a distinct user role. This allows the Company to turn off entirely or customize marketing towards them, i.e., one will not be pushing them towards starting new groups, paying for AddOns, etc., while one can promote things of interest to them so that they enjoy the experience.

Next discussed are some membership permission distinctions that are preferred. The person who creates the group is by definition the SiteOwner, and has all the permissions of the SuperAdmin. The SiteOwner may confer SuperAdmin status on any member (except a Minor), and there can only be one SuperAdmin at a time. SiteOwners can delete any content, and SuperAdmins can delete any content except the SiteOwner's.

Roles Assigned to Invited New Members.

By default, any member of any role can invite new members, but this can be changed by the SiteOwner or SuperAdmin. When a member invites a new member, the inviter has the option to specify the powers of the invitee. The inviter cannot specify that the invitee will have a higher role than themselves, so a Viewer may not invite someone to be a Contributor. A Viewer can only invite someone else to be a Viewer. And for example, a Contributor with Invite powers may invite someone to become a Contributor with or without Invite powers. In general, regardless of the user's role, they may only invite new users into a group with equal or lower permissions than their own.

Unfollowing Guidelines.

Members (other than Minors) can "unfollow" other members, but nobody may unfollow the SuperAdmin or SiteOwner. "Unfollow" means that the viewer does not see any content or comments from the unfollowed member.

What Controls Distinguish a SuperAdmin.

When the SiteOwner empowers another member to be the SuperAdmin, the new SuperAdmin has the following abilities by default:

Settings for Services, Apps, Colors
Can remove other members
Can delete other member's content
Can change other member's roles
Can add content
Can comment on other member's content
Can modify other member's content
Can allow ownership of their content by other members
Can invite others
Can create Groups The first four (or other subset as determined, etc.) of these listed controls are what distinguishes this person as a SuperAdmin, and the SiteOwner may give or withhold various combinations of these controls to the SuperAdmin.

What Permissions Distinguish a Contributor.

By default, Contributing Members have the following powers, though site-wide defaults may be changed by the SO/SA:

Can add content
Can comment on other member's content
Can modify other member's content
Can allow ownership of their content by other members
Can invite others
Can create Groups
Group Content Ownership.

A Group may choose (based on permissions granted to it by its members) to own and aggregate member posted resources and content. A few of the many possible examples are photo albums, shared and/or modified documents/content/resources, etc. Premium Services, Standard Services, Apps and Add-Ons may include group-ownership of content and resources posted individually by group members. Group-owned content may have its own set of permissions, including those delineated by members when posting the content, by virtue of the permissions of the service, app, or add-on, as well as the permissions of the SiteOwner and SuperAdmin, etc.

Content Permission Hierarchy.

The content-level permission chosen by a member who posts content supersedes the member-level permissions. i.e. when posting, a member may specify that another member may view but not comment. A SO/SA can always remove any member's content from the group.

Group Defaults and Permissions.

The SO/SA may set defaults and permissions for the entire group, and permissions for each individual member. If the SO/SA disables sharing for the entire group, then when a member uploads content, they do not have the option to allow external sharing.

What Happens to Modified Content.

A piece of content may also be declared modifiable by its owner with respect to a Group. An modifiable piece of content may be modified by a given User (other than the owner) if the content is declared as modifiable with respect to the given Group and the given User is a member of that Group and has the Modification Access Level with in that Group. Of course, the owner has full access to his/her own resources. How a piece of content can be modified depends on the type of the content. When a piece of content is modified, a copy is made and placed in the modifying User's personal content repository, so no history is lost.

Permission Changes to Individual Members.

The SiteOwner and SiteAdmin may also assign different roles/powers to other members, for example: change a Viewer to a Contributor or remove the ability of a Contributor to add comments or invite new members.

Group Termination.

The SiteOwner is the only member who can delete a group, and the SiteOwner may not be removed from the group by anyone except the SO themselves. If the SiteOwner wishes to remove themselves from the group, they must first transfer SiteOwnership to another member.

Settings for Services, Apps, Colors.

The SiteOwner/SuperAdmin chooses defaults for the site as a whole, including which services and add-ons to include, as well as the site color scheme. Individual members (including minors) can deviate from these defaults, and choose to remove services from their view of the site, or change their view of the color of the group. Anyone except a Minor or Read Only member can purchase Add-ons which the whole group may (but does not have to) use.

Content Permissions (Site Owner, Super Admin, Contributor).

When one of these members posts a piece of content, they may choose from options that control how other members may access it:

No View
View
Comment
Share
Modify

In general, the default is for content to have members be able to view and comment on it. The member who posts (except for Minors) can modify the checkboxes to their liking for the content they are posting and for whom the content is posted for. The SO/SA may change site-wide defaults such that members may post content but not comment on it. In this case, existing comments would persist, but future comments would be disabled. Similarly, any member might change the permission of a piece of content to remove comment-ability, which leaves existing comments in place, but they can be individually deleted by content owner.

The "No View" option is only visible when the member is setting content permissions individually for different members in a group.

The "View, Comment & Share" setting allows members to share that content with other groups and external sites like FB, TW, etc.

Note that Shareability is the product of two intersecting permissions: the content resource must be specified as shareable, AND the viewing member must have general sharing permissions.

When "Share" is permitted, a member who does not own the resource, and who has permissions to share, can share the resource as they please, and once the member shares the resource, then that resource also resides in their personal content area.

Content Ownership.

A member always owns their content. And through permissions and controls, members can allow ownership of their content by other individual members and/or by the groups they are in.

Allow specific members to own
Allow the group to own (for photo editing and albums, document sharing, content modifications, etc.

If these choices are selected, and if the specific content has become owned by the Group (if placed in a group photo album, for example), then if/when the User deletes the content from their personal area, the content remains in the other places where it has become "owned."

Third Party Content Sharing.

There is another kind of more targeted sharing of content, which involves sharing group content with a third party for a single instance for a purpose such as printing a group album. This does not require that each piece of content be set to "View, Comment & Share." As long as a group member may view the content, they may print it, even when that requires temporarily sharing it with a third party.

Further preferred aspects of the invention are next discussed.

Users Groups and Resources.

A Resource is content that is owned by a User. A User uploads a Resource into the User's UserSpace or links to an external Resource. The User and can share their Resources with one or more their Groups. A User within a Group in which the Resource has been shared with, has access to that Resource according to that User's Access Levels within that Group. A User has the full set of Access Levels to resources they uploaded or linked to.

A User can also share a Resource with one or more ore individual Users. In this case, an ad-hoc group is created containing just the selected users. For our purposes here, the ad-hoc group behaves just like a regular group except that it does not show up as a ordinary group. In effect, it is a group of its own and all discussion about sharing with Groups applies directly with sharing of a list of one or more individual Users. Once the ad-hoc group is created, the mechanism for sharing with a list of individual users is identical to sharing with a Group. In other words, everything that holds true for sharing with a group also applies to a list of individual users. So in the following discussion everything said about sharing with a group also applies to sharing with a list of individuals.

The Resource owner declares the Access Levels of the Resource with respect to the Groups it is being shared with. This can be done when it is shared with a Group, or at any later time. Resource Access Levels include Read, Comment, Modify, and Delete. If a resource is shared with a group, all group members can read it. If that resource is declared a comment-able, then all group members with whom it is shared can make comments on it. If the resource is declared modifiable, then all group members within a group with whom it is shared with can make changes to that resource providing they have Modification Access for that group.

A Resource may be declared to be comment-able by the owner with respect to a Group. If the Resource is comment-able with respect to a Group, then Group members in that Group can add comments. The comments are stored along with the Resource, categorized by GroupId, to ensure that comments will not cross over between Groups. So if a resource is shared with 2 groups, comments made by those in one group will not be seen by those Users in the other group but not in the first group.

A Resource may also be declared modifiable by its owner with respect to a Group. An modifiable Resource may be modified by a given User (other than the owner) if the Resource is declared as modifiable with respect to the given Group and the given User is a member of that Group and has the Modification Access Level with in that Group. Of course, the owner has full access to his/her own resources. How a Resource can be modified depends on the type of the Resource. When a resource is modified, a copy is made and placed in the modifying User's UserSpace, so no history is lost, A Group has a name, GroupId and a list of Users. Each User in the Group has a set of Access Levels to the Group resources. Access levels include: read, edit, modify, add, delete. Roles are defined as sets of Access Levels. Roles include Viewer, Contributor, Limited, SuperAdmin, and SiteOwner. An Admin has all access levels. A Contributor can read, add comments, and edit/modify if permitted. A Viewer can only read content. Any group member can comment as long as the resource is comment-able.

The Access Levels of a Resource with respect to a given User default to on the Role of the User with Groups that the Resource is shared with. They can be customized.

Each User has a content feed which contains all the resources owned by that User. It can be filtered, sorted and queried. It can be represented as an Atom feed and manipulated via the AtomPub protocol or other means.

Each Group has an associated Group content feed. The Group feed for a given User within a Group contains all the resources shared with that Group. Each resource in the list also contains the access levels for that User. This is useful for knowing which Resources in the Group feed are editable, commentable, and modifiable.

How to Indicate with where to Share with?

Send a PUT web request to the UserSpace URI Sgrouples/used<userId>/<resourceId> with the groupIds with which to share with. The list of groupIds are the resources list of GroupIds. Use a POST to add groupIds instead of replacing.

How to Authorize a User's Request for Group Content?

A User requests access to a Group resource via an HTTP request.

The HTTP method determines which access level is needed: GET requests require Read Access, POST requests require Create Access, PUT requests require Modify Access and DELETE requests require Delete Access. Then, Get the userId from the authenticated AccessToken.

Check the list of group members for the given userId. If the userId is not in the group then no access whatsoever is provided. Return a 404, UnAuthorized response code.

Check the resource. If the resource is not shared with the given group, the return a 404, UnAuthorized response code.

The Access Levels of a Resources with respect to a given Group are stored in the Resource collection. The Resource collection contains documents which include the following structure:

```
resource = {
  owner: "owner email here",
  type: "message",
  // other data here ...
  // groups contains a list of groupIds indicating the groups the resource is
  shared withgroups: [groupId1, groupId2, ...]
}
```

Or for a more fine grained approach:

```
resource = {
  owner: "owner email here",
  type: "message",
  // other data here ...
  // groups contains a map of groupIds
  // along with the access Levels for the given group
  groups : { groupId1 : [ accessLevel1, accessLevel2] ,
         groupId2 : [ accessLevel2, accessLevel3],
         },
}
```

The above document indicates the resource is to be shared with the group with groupId1 with accessLevel1 and accessLevel2 and is shared differently with the group with groupId2. ResourceAccessLevels include: comment-able, editable, modifiable, addable, delete-able and apply to the group access of a Resource.

Users within the group have a set of User AccessLevels that apply to what the User can do to resources within a Group, assuming the Resource allows that level of access. This can be determined by a fixed role or specified as a list of fine grained UserAccessLevels, as illustrated below.

Here a group has three members whose UserAccessLevels are defined by roles which contain fixed sets of permissions.

```
group = {
  // ...
  members : {
    name : "Group Name",
    // ...
    members : {
      <userId1> : "Admin" ,
      <userId2>, "Contributor" ,
      <userId3>, "Viewer" }
  }
```

Here is the fine-grained example:

```
group = {
  // ...
  members : {
    name : "Group Name",
    // ...
    members : {
      <userId1> : [accessLevel1, accessLevel2, accessLevel3],
      <userId2> : [accessLevel1, accessLevel2],
      <userId3> : [accessLevel1] }
  }
```

The second form avows for individually tweaking of fine grained access levels. In either case, the question becomes, does the user have the required Access Level for the given groupId.

Figure 23:
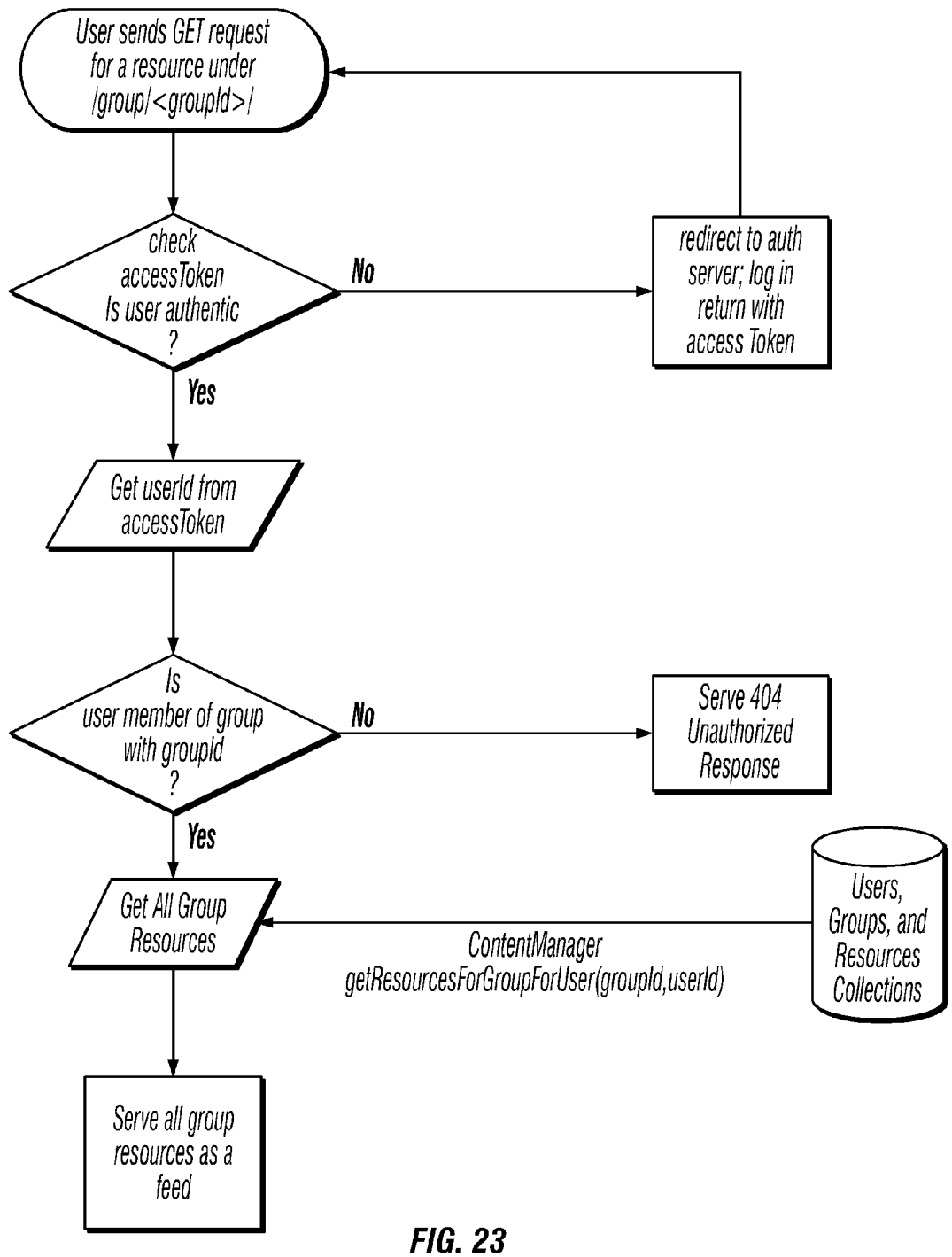
FIG. 23 is a flow chart of the preferred processing of a GET request according to the invention.
Figure 24:
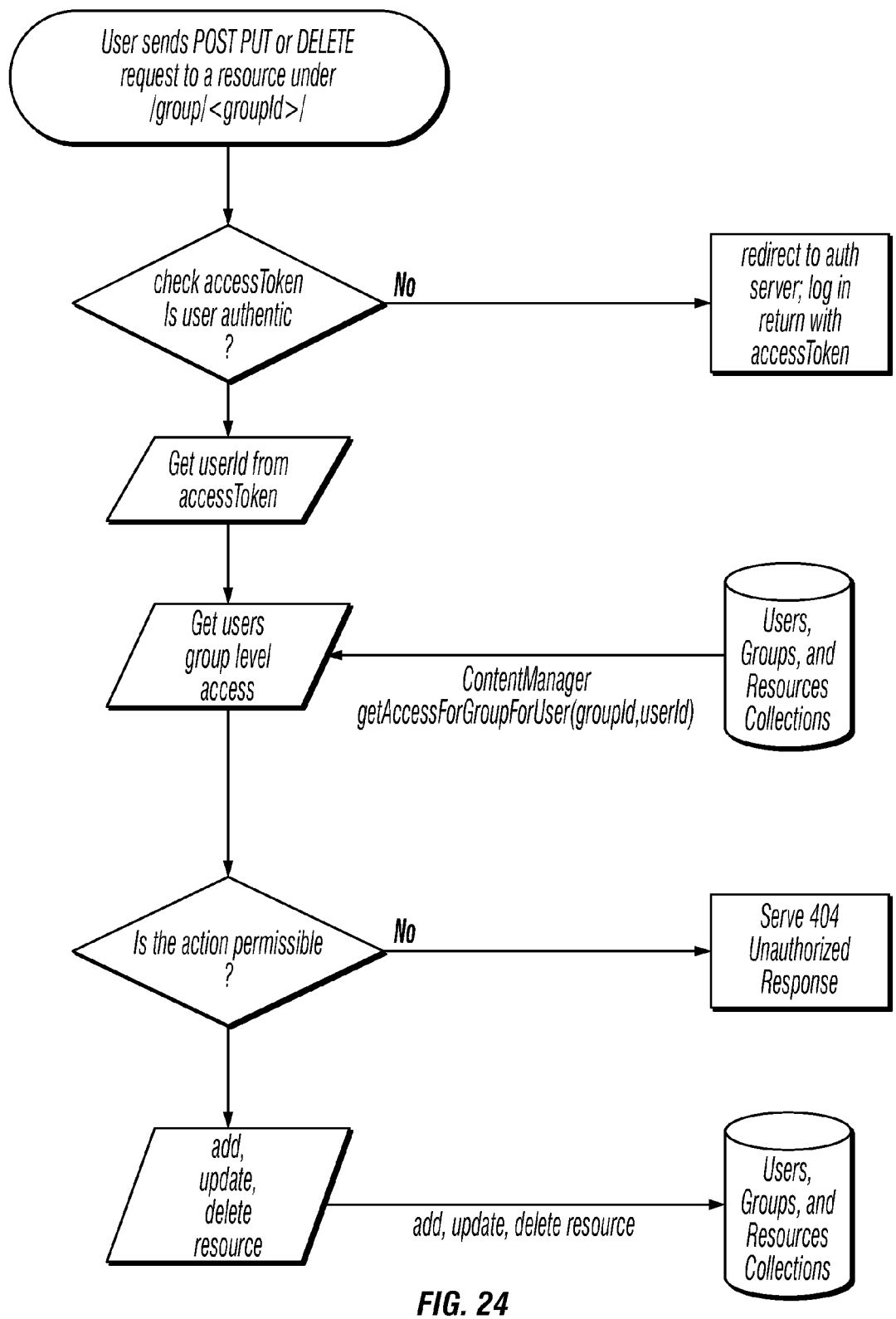
FIG. 24 is a flow chart of the preferred processing of a POST, PUT, or DELETE request according to the invention.

In either case, the User must have the appropriate access level for the request, as shown in FIGS. 23-24.

An alternate implementation is next discussed.

How to Indicate with Whom to Share with?

As in the first version, above, send a PUT request to the group resource URI (Uniform Resource Identifier) containing the list of groupIds. In this implementation, the Authorization Server handles the request and updates it persistent store.

How to Authorize a User's Request for Group Content?

Require each User to login via an Authorization Server to obtain an access token. The access token contains in an encoded form the list of groups the user belongs to along with the Access Levels the User has with respect to each Group in the list. The Content Manager is able to decode the Access Token to determine if a request by a given User to access a given Group Resource is valid. It does not need to refer to a database as the Access Token contains all the information needed. The Authorization Server is responsible for maintaining the resources collection.

Admin Permission Control.

The Site Owner has the ability to define and change the roles and permissions of members in a group. When a group is created, the owner may choose from a variety of pre-defined default sets of permissions that best serve the function of the group. For instance, in one implementation a group may be specialized for interaction and collaboration, and have permissions designed to serve these goals, while another type of group may be intended for sharing content with members who may only view it, and perhaps add their comments.

The owner may also appoint other members to be Administrators, who have similar permissions to their own, with the exception that they may not remove the owner or delete the group. In the general default case, the Owner may appoint only one Admin, but they have the option to allow more than one. When a member is promoted to admin, they are automatically given all possible permissions, except those mentioned above.

A group has three default roles in addition to owner and admin. These are:

Contributor
Limited
Viewer

A Contributor always has posting permission; a Limited member always requires approval to post; a Viewer may never post. Beyond these initial constraints, the owner or admin may define further custom permissions for any of these roles. These include the permissions to;

Comment
Edit
Reshare
Invite others

When the Admin/Owner changes the definition of a role, this applies to all members (past and future) who have that role. As this is a significant change, the Owner/Admin sees a confirmation dialog explaining this to them, and allowing them to proceed or cancel. However, individual members whose permissions have been customized do not have their permissions affected.

User Posting Permission Control.

Every posting member can set the default permissions for their own posts. They may allow or prevent others from commenting on their content, resharing their content, and editing their content. The initial default is for commenting to be permitted, but the user must enable the other permissions. The Site Owner/Admin may change these initial defaults if they wish. When the owner of a piece of content (for instance a photo), sets the permission to allow resharing, then other members can not only reshare that item, but they can view it in full size and download it. When the owner of the item forbids resharing, then other viewers may see the item at full-size (if it's a photo) and download the content.

These user permissions serve to control the default permissions for anything the user posts or shares. However, the user may also override these permissions on an individual post basis. So for example, he may make an exception to allow a certain post to be shared or edited, while in general this is forbidden.

Invitations.

During the invitation process, a member who has Invitation permission may invite others into the group. In this case, they may only invite users with less than or equal permission to their own. A Contributor can invite others as Contributors, Limited members, or Viewers. But a Limited Member may only invite other Limited members, and a Viewer may only invite other Viewers. For these last two cases, the inviter does not need to be offered a choice of roles for the invitees, since they may not select any but their own. If a member has had their own permissions customized, they may only invite others into the group with the same customized role. One way to do this, most simply, is to adopt the identical set of permissions. Another way to do this is to allow the inviter to select a subset of their own permissions for the new members they are inviting.

There are additional levels of permission control a site owner may choose to enable. Those illustrated above are just one simple way permissions control can be implemented in the site. For instance, in a one implementation, the Owner/Admin may permit members to assign tags to others content, or this permission can be revoked. In a simpler implementation, illustrated below, this Tagging permission is bundled with Posting permission. Similarly, Editing and or Commenting permissions may be bundled with Posting permission to simplify the administration of permissions.

Figure 32:
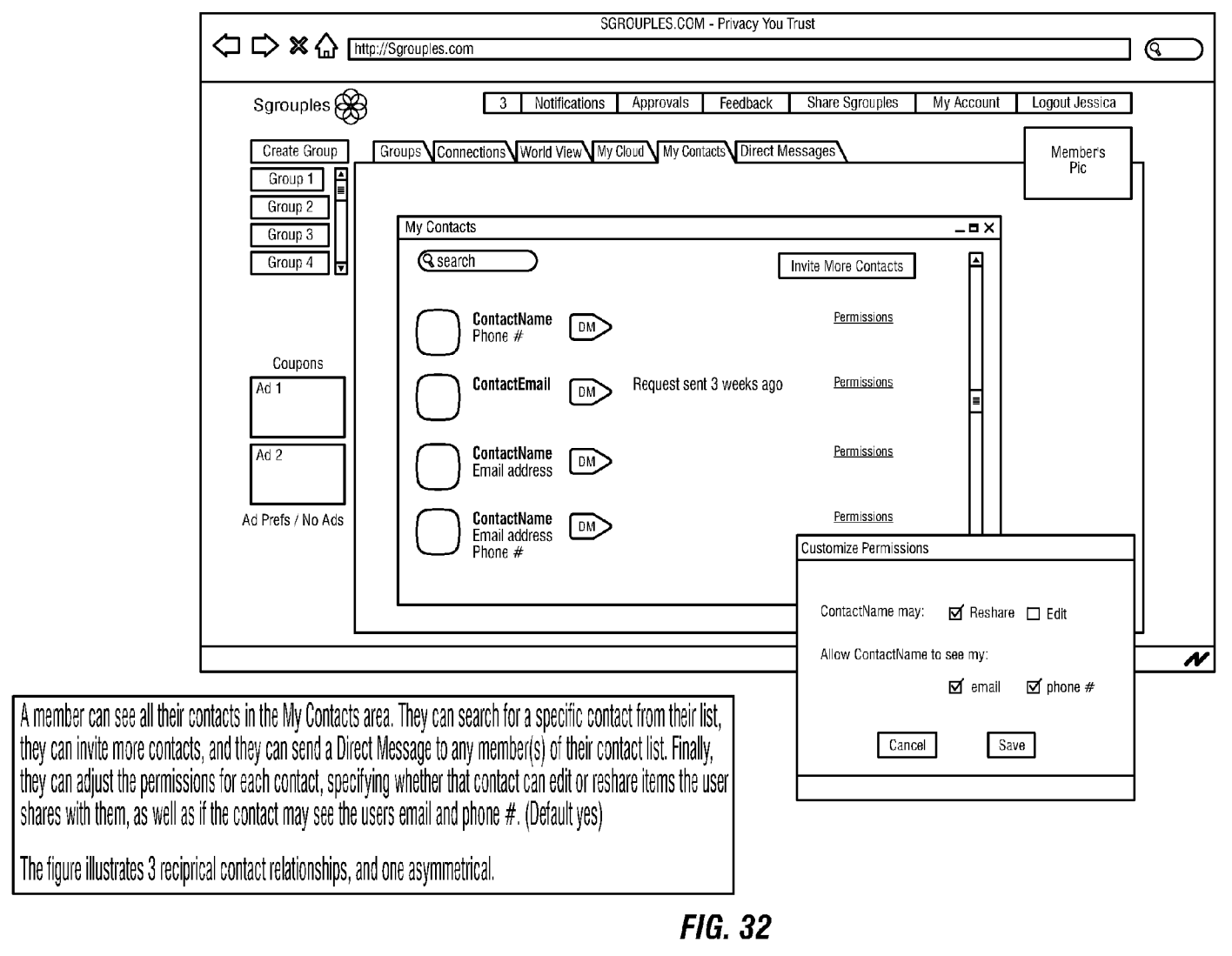

A user ("Member A") may also invite individuals to connect with them inside the online service platform but outside of a specific group context. See FIG. 32. In this case, the invited user ("Member B") joins the platform (if they are not already members themselves) and these two members now can exchange content symmetrically. Member A has a list of contacts, and Member B appears on this list (and vice versa). The default permissions respect user privacy and are set so that neither member automatically has permission to see content owned by the other; the content must be explicitly shared. Member A then has the option to post or share content directly to Member B (and vice versa). Member B now has viewing permission for the shared content item. Member A can also assign further permissions such as Edit, or Reshare permission to Member B. In this way, Member A can share an item and allow Member B to edit it or reshare it. Each member may either uniformly set the default resharing and editing permissions for all of the members on their list of contacts, or they may set them on an individual member by member basis.

A member can easily create a group with selected members of their contact list. They may also add individuals from their contact list into any of the groups they belong to and in which they have invitation permission. Once this occurs, the member's default resharing and editing permissions in the group supersede the individual resharing and editing permissions of the member in the contact list. The member can, however, set the permissions for their contact within the group to match the permissions they have assigned to them in their contact list. Another way to implement this is to have the permissions assigned to a contact in the contact list translate into the group when they are invited there, superseding the default permissions in the group.

Subject to the varying permissions, a user may in one action share a piece of content with one or more of their groups, one or more of their networks, and one or more of their contacts. When the user shares an item with the group, it appears in the group context. When they share it with members on their contact list, it appears for those members as a Direct Message. An item can be shared with a group and directly with a member in that group, in which case the recipient sees it both in the group and in their direct message area. The same item may have different resharing or editing permissions in these two contexts.

There can be both reciprocal contacts and asymmetric contacts. When Member A first shares an item or requests contact with individual B, before individual B registers at the online service, Member A and individual B are in an asymmetrical relationship. Member A can then easily share content with individual B (without having to re-enter their email address), and individual B gets an email notification of the shared content. Only when individual B registers, do they enter into a symmetrical relationship, in which both members appear on each other's list of contacts.

Tagging Permissions.

Figure 25:
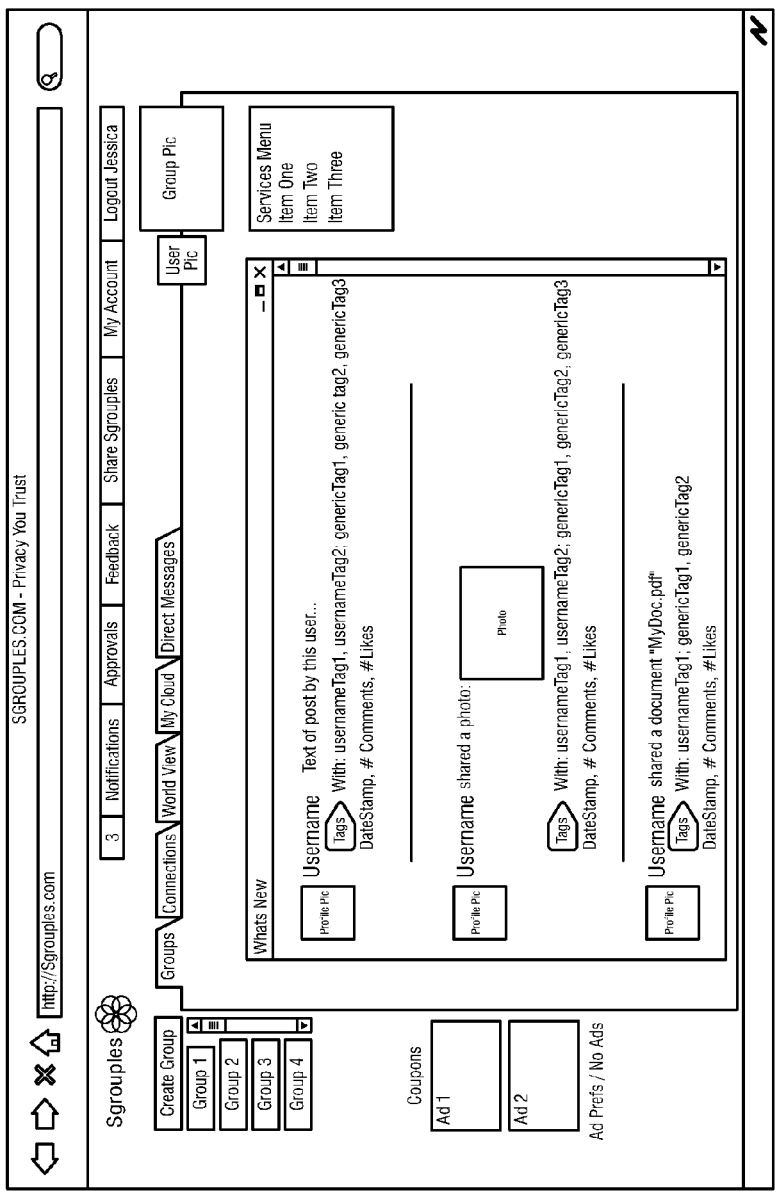
FIGS. 25-27 illustrate the use of tags with the invention.
Figure 26:
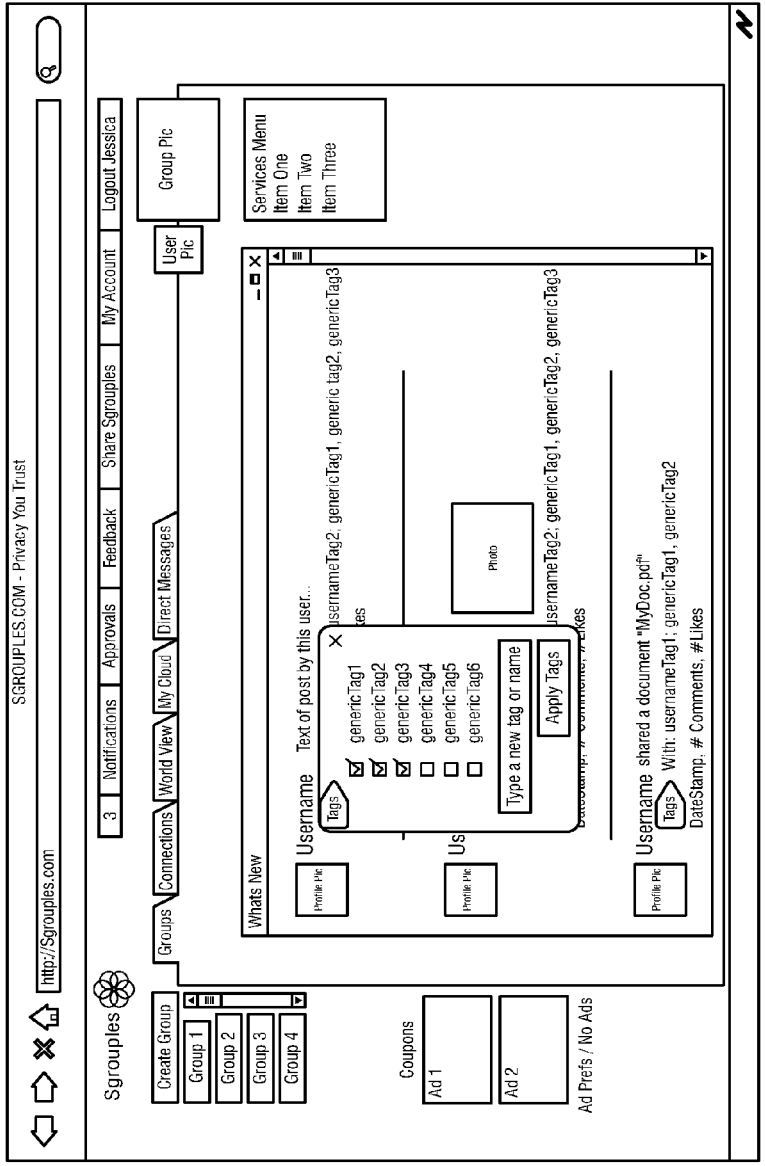
Figure 27:
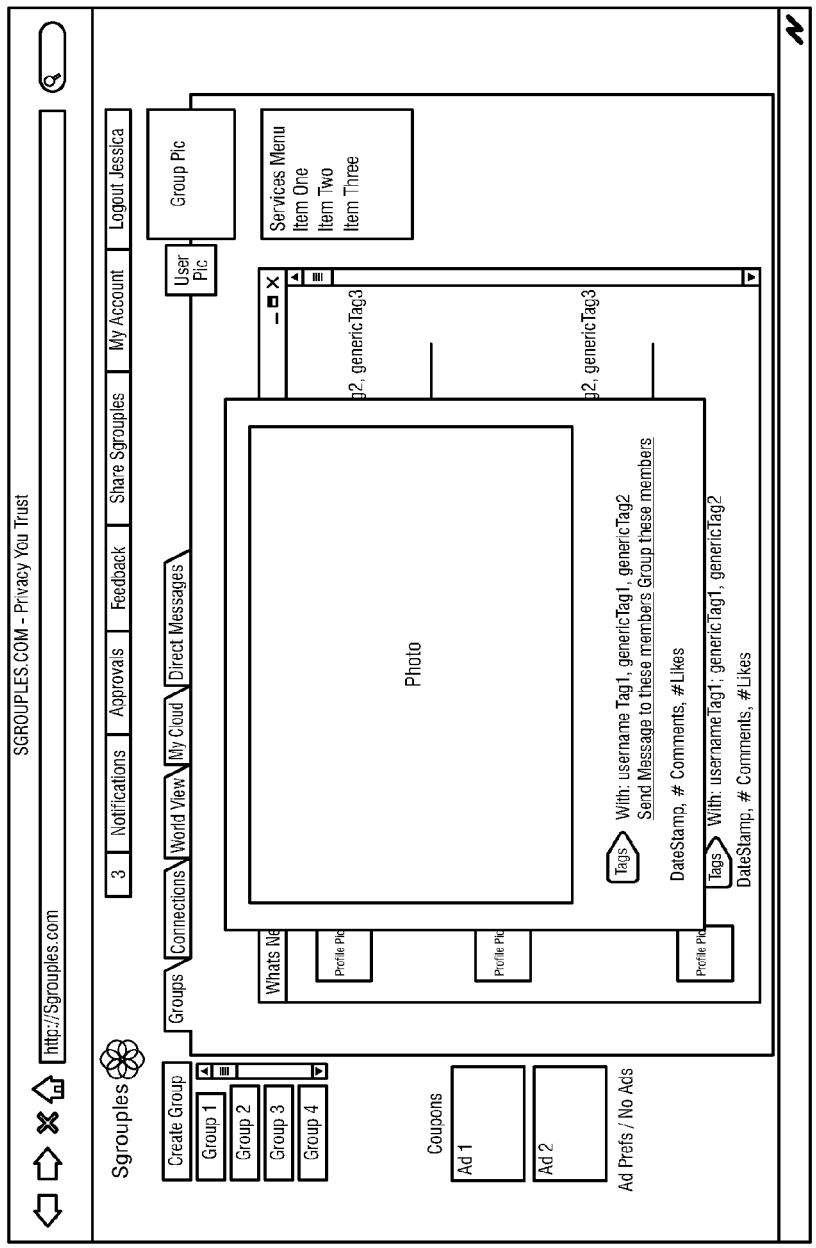
Figure 28:
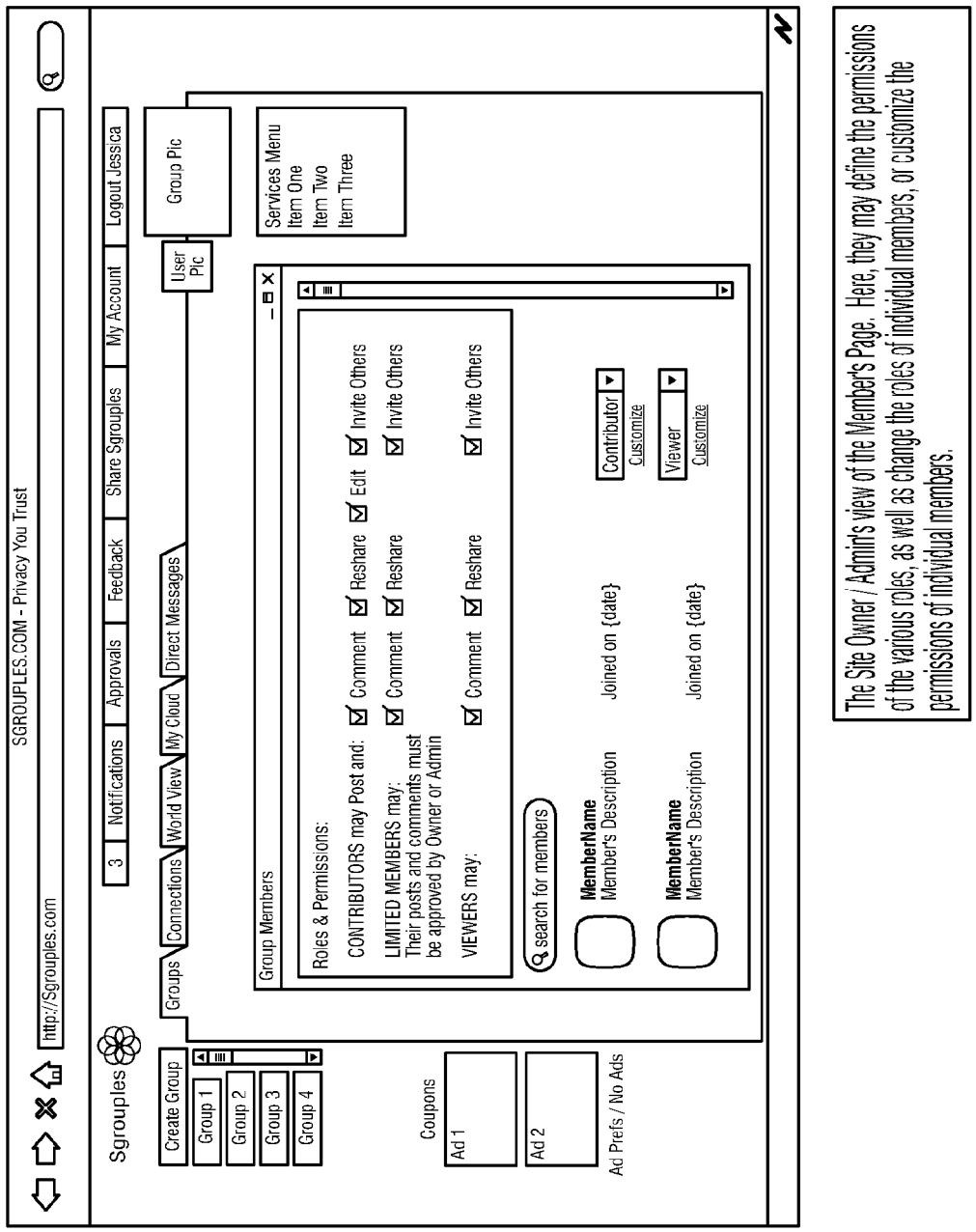
FIGS. 28-31 illustrate additional permissions settings pages according to the invention.
Figure 29:
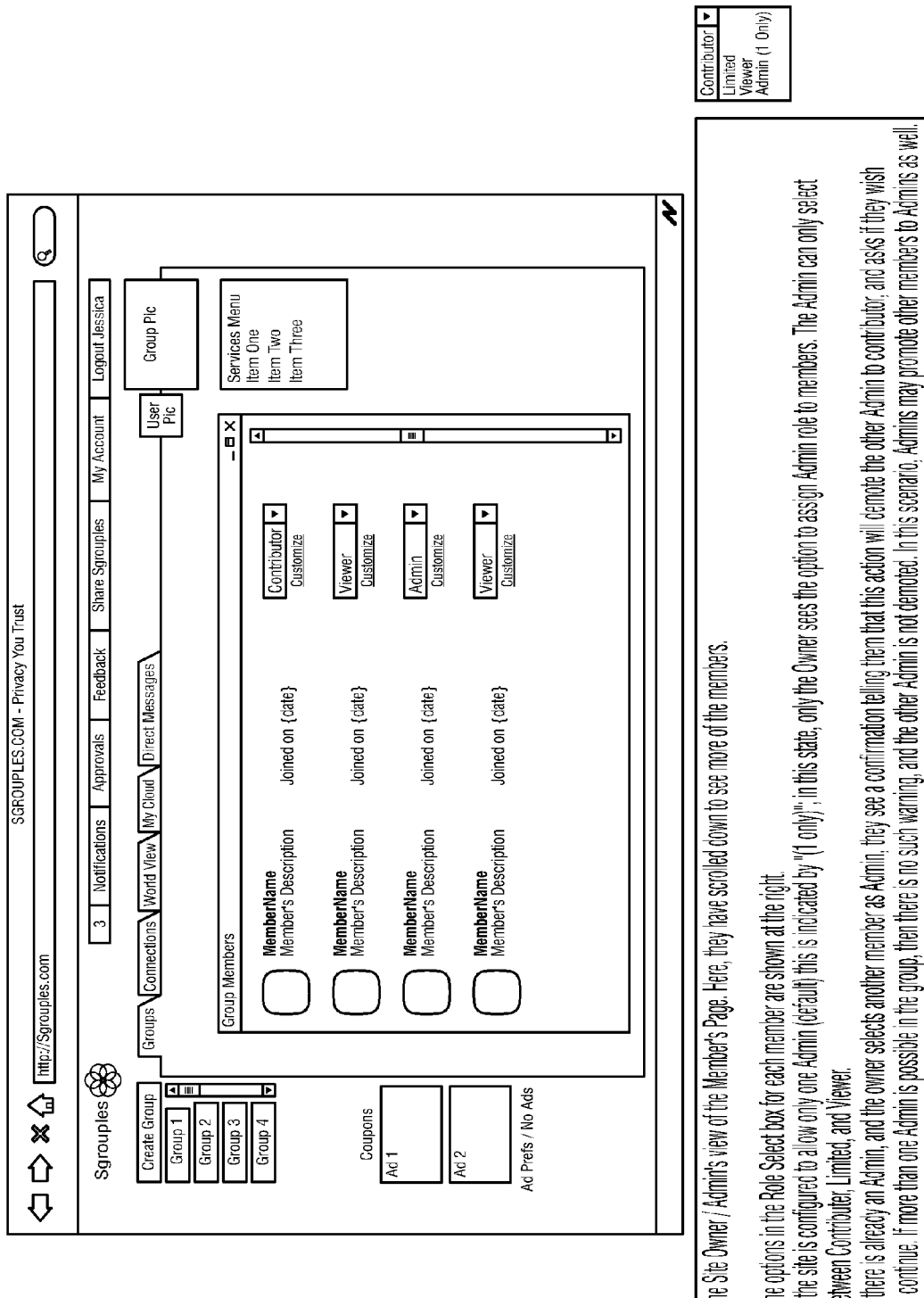
Figure 30:
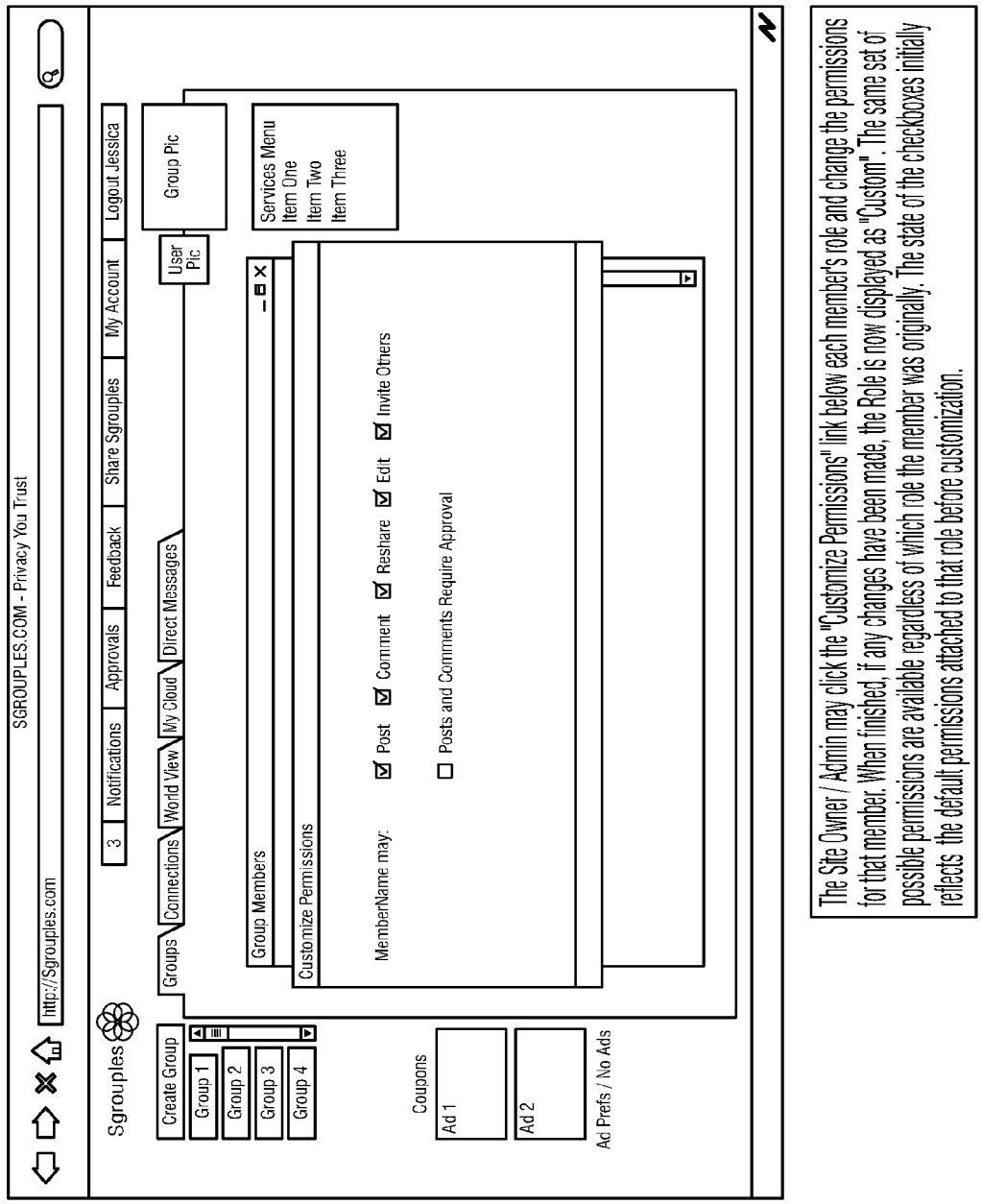
Figure 31:
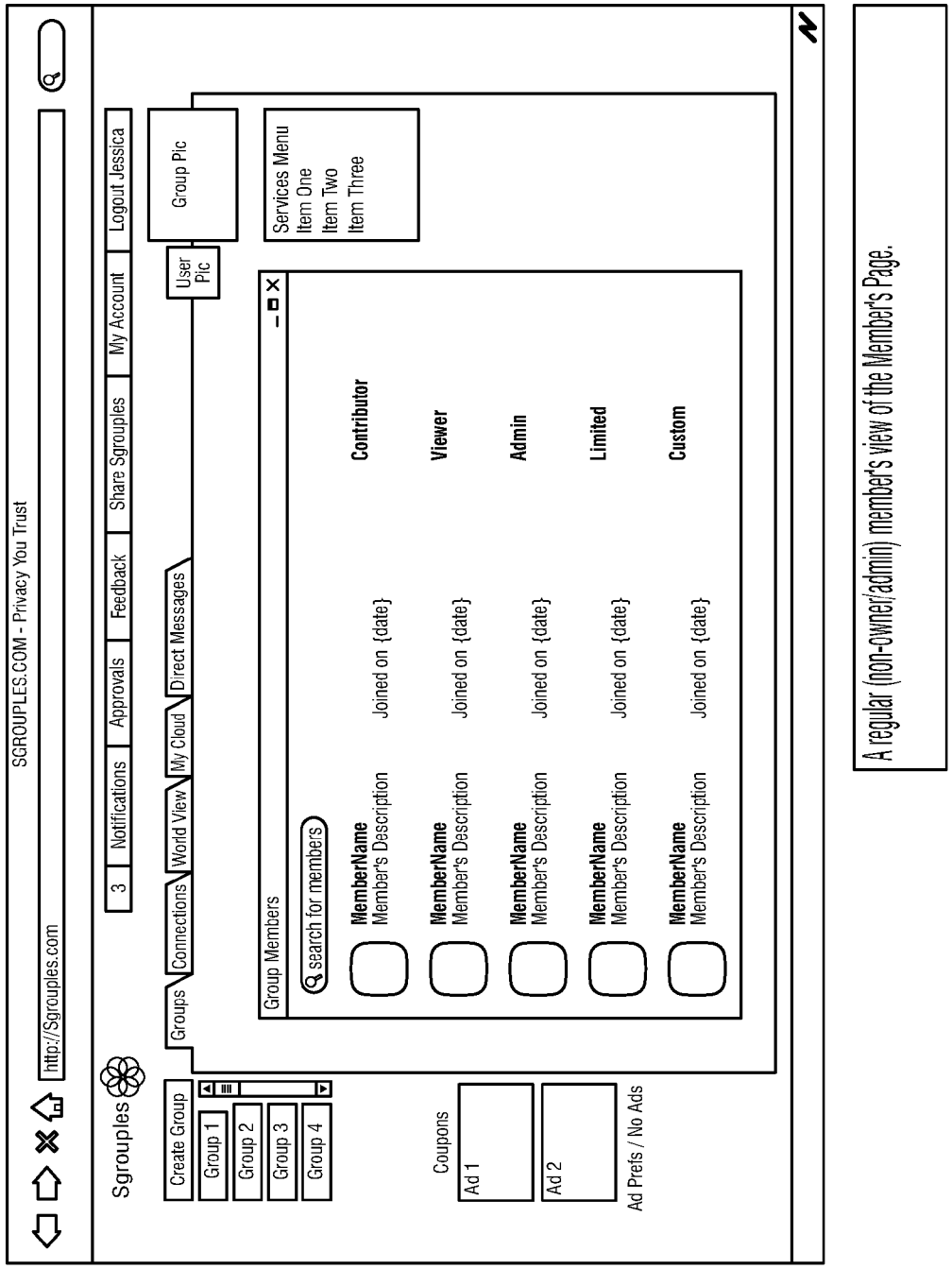

Users are able to tag posted items of various types, including Text posts, Photos, Check it Out items (Links+) and Docs. The poster has the option to tag an item during the posting process, or later. Other group members (who having posting permission) may also add tags to an item. See FIGS. 25-27. There are two basic types of tags: Generic Tags, and Username Tags.

A "Generic Tag" can be any word or words up to, preferably, 40 characters (arbitrary length that should display nicely). The tags are basically used as categories to organize information, such as "Vacation," "Finances," "Good Ideas," "Classical Music," "Sports", etc.

A "Username Tag" is the first and last name of any user in the current group. (What happens if I post to 3 groups, and tag a member—who is in 2 of them?—The user is tagged in both groups.) (What happens if there are two members with the same name in a group?—2 John Smiths, or 2 Jan Kowaiskis?—The tagger sees both names in the autocomplete list, and can choose the correct one, based on profile picture, etc.)

When a post is tagged with a Username Tag, the tagged user receives a notification onsite (and if their permissions are set to default, they also receive an email notification that they have been tagged in a post). This notification does not occur of the tagger tags himself.

When tagging an item, the tagger can choose from a list of existing Generic Tags in the group, or they can add a new tag by typing it into an input field. The new tag can be a new Generic Tag, or it can be a Username Tag. When the tagger begins typing into the input box, the autocompleter suggests matching member names, which the tagger may select or ignore.

Tag Scope.

Tags are specific to a group. When a user opens the Tagging widget in a group, they see the list of previously used generic tags in that group, and they can add a new one. They can also create a username tag that autocompletes by typing the first letters of the user in that group.

During the posting process, a user may choose to share an item with multiple groups. In this case, when they choose to add tags, the tagging widget must show them the list of available tags in all of the selected groups. Tags should be organized by group, sorted alphabetically within each group, and color coded.

When a user shares a tagged item from one group to another, the tag is not automatically shared with the second group.

Private Tags.

When a user tags a piece of their own content in a group, that content item and the tag are also stored in the user's My Cloud. This only refers to Generic Tags; Usernname tags are not stored in My Cloud. When in My Cloud, the user sees and can sort by any tags that they have created in any of their groups, or in My Cloud. Tags that a user creates or assigns on a piece of content in My Cloud are NOT automatically shared with a group when the owner shares the item with that group.

Removing Tags.

Only the item owner and the siteowner/admin may remove a tag from an item. The only exception is if the tag is a member name, then that member may remove the tag from an item they do not own. (Scenario: User A tags User B in an unflattering photo, then User B has the right to remove the tag of their name from User A's photo, but not any other tags.)

Deleting Tags.

Perhaps a tagger made a typo and misspelled a tag. Must this tag show up forever in the list of available tags in that group? No. As long as the tag is applied to at least one content item, it persists in the set of group tags. If the user creates a tag and then removes it or does not apply it to the item, the tag is not saved in the list of group tags. When an item that is tagged is deleted, if it is the only item with that tag, then the tag is also deleted.

Filtering by Tags.

A user in My Cloud may filter their content by selecting one or more of their private tags, and they see only the items that match the selected tag(s). In a group, the user may filter their content based on one or more of the group tags. In this case, they may filter content to show only items matching one or more of the group generic tags, and/or any username tags from within that group.

The resource data model preferably employed with the invention is next discussed.

Simple Form: Resource Access Levels are group independent. One set of Access Levels per Resource. All groups the resource is shared with have the same access. For example, the resource itself is declared modifiable so all groups it is shared with allow for modifying by Users in the Group who have the modify permission for that group.

Complex Form: Resource Access Levels can vary with different Groups, So a User could declare a Resource to be Read only in one group and Modifiable in another.

The role data model preferably employed with the invention is as follows.

Simple Form: Each user belonging to a Group has a Role in that group. That role defines a set of Access Levels and defines what the User can do to resources in that Group.

ComplexForm: Use Role to just set up default Access Levels for a given User in a given. Allow these levels to be tweaked individual. Users can then have a set of Access Levels that may not directly correspond to any given Role and are customizable.

The preferred set of URI resources employed in the invention is:

| URI path | HTTP methods | Comment |
| --- | --- | --- |
| /Users | POST | Create User |
| /User/<UserId> | GET | Get User feed |
| /groups | POST | Create Group |
| /group/<groupId> | GET | Get Group feed |

Note that the present specification and claims define the following terms as follows:

UserSpace

The space where a User can load personal content to.

UserSpace Content

The sum of the Users content, both private and shared.

GroupSpace

The sum of the content shared with the Group by the Group's members.

GroupSpace Content

Content that has been shared with a Group.

Share Content

A User can share content with a Group or individual. The level of access can be specified on the Group level of individual level.

Resource

Also called content. Includes:
   User content uploaded to their UserSpace.
   User's social media via OAuth API.
   Public data.

Resource Access Level

The access level of a resource with respect to a given group. These include:
   Readable—able to be viewed.
   Comment-able—able to be commented on.
   Modifiable—able to be altered, is dependent on resource type.
   Addable—able to be added to as in adding photos to an album resource.
   Deletable—able to be removed.

User Access Level

The access level of a User to resources within a Group.

These are what a User can do to resources with in the Group providing the Resource allows it.

A user can
- View—the user can see the resource.
  - Comment—the user can comment on a resource providing it is comment-able.
  - Edit/Modify—the user can alter the resource as in applying a filter to a photo.
  - Add—the user can add to the resource.
  - Delete—the user can delete the resource.

Meta Data

Data associated with a resource. Includes comments, tags.

Access Type

The level of permission associated with a User and a resource.

Access/Permissions

The level of control a User has with respect to a given resource.

Includes Read, Edit, Modify, Add and Delete.

External Website Mobile Cloud

Any external resources public or private.

GroupAuth

The mechanism of sharing User resources with Group, indicating with whom to share and authorizing access to Group resources.

Slurper—Content

A way to bring in content from third party social services.

Slurper—Members

A way to bring in members from external sources.

User

A member of an online service or website.

Types of members include
- Content Owner—The User who uploaded the content is the owner of that content.
- Group Member—A User who is a member of a Group.
- SuperAdmin—A Group member with full access.
- Group Leader—The creator of the Group.

Group

A collection of Users with read access to the associated GroupSpace.

The members may also be able to contribute to the GroupSpace.
- List of members
- Leader
- Super Admin Customized View User can customize their view of their UserSpace and GroupSpace through filtering, sorting and querying.

The following source code implementation examples are illustrative of important aspects of the invention, and are coded in Java:

HttpRequestManager

```scala
package com.Sgrouples.http import javax.ws.rs.{ GET, POST, PUT, DELETE }
import javax.ws.rs.{ Path, PathParam, Produces }
import javax.ws.rs.core.{ HttpHeaders, Context } import com.Sgrouples.model._
import com.Sgrouples.content._ import scala.xml.Node

@Path("/users")
class HttpUserManager(userGroupManager: UserGroupManager) {
  @POST
  def addUser(@Context headers: HttpHeaders, in: Array[Byte]) = {
    val accessToken = headers.getRequestHeader("ACCESS_TOKEN")
```

```
    // if (accessToken == null) redirect to AuthServer

// get user making request from AccessToken
    val user = User.fromToken(accessToken)
    // if (user == null) send 404 Unauthorized response val newUser = User.fromIn(in) // user to be added
    userGroupManager.createUser(newUser)

// return appropriate status
  }
}

@Path("/user")
class UserContentManager {

// Get UserSpace feed for userId (TODO add filtering, sorting and querying)
  @GET @Path("/{userId}")
  def getUserContent(@PathParam("userId") userId:String):Node = {
    // get AccessToken from request headers
    val accessToken = headers.getRequestHeader("ACCESS_TOKEN")
    // if no AccessToken redirect to AuthServer to log in and get one
    if (accessToken == null) sendRedirect(AuthServer)

// get user making request from AccessToken
    val reqUser = User.fromToken(accessToken)
    if (reqUser == null)  send(UnauthorizedResponse)

// only user that has access to a UserSpace is the owner of the UserSpace
    if( reqUser.id != userId ) send(UnauthorizedResponse)

// now create and return UserSpace feed
```

```
    val user = User.byUserId(userId.toLong)
    user match {
      case Some(user) => new UserFeed(user, user.resources).feed
      case None => {
        // what to do in case of no user?
        throw new Exception("No user found for userId:" + userId)
      }
    }
  }
}

@Path("/groups")
class HttpGroupManager(userGroupManager: UserGroupManager) {
  @POST
  def addGroup(@Context headers: HttpHeaders, in: Array[Byte]) = {
    // get User from access token in  headers
    val accessToken = headers.getRequestHeader("ACCESS_TOKEN")
    // if (accessToken == null) redirect to AuthServer // convert in to a group
    // add group do persistent store with User as Admin
  }
}

@Path("/group")
class GroupContentManager {

// Get GroupSpace feed for given groupId (TODO add filtering, sorting and querying)
  @GET @Path("/{groupId}")
  def getGroupContent(@PathParam("groupId") groupId:String):Node = {
    // get AccessToken from request headers
    val accessToken = headers.getRequestHeader("ACCESS_TOKEN")
```

```
// if no AccessToken redirect to AuthServer to log in and get one
if (accessToken == null) sendRedirect(AuthServer)

// get user making request from AccessToken
val reqUser = User.fromToken(accessToken)
if (reqUser == null)  send(UnauthorizedResponse)
val group = Group.byGroupId(groupId.toLong)

// reqUser must have ReadAccess to the GroupSpace given by groupId
// all group member have group  ReadAccess
if( !group.members.contains(reqUser) ) send(UnauthorizedResponse)
(new GroupFeed(group, group.resources)).feed
    }
}
```

UserGroupResourceModel

```
package com.Sgrouples.model import scala.xml.Node
import scala.xml.XML import java.text.SimpleDateFormat
import java.util.Date // contains the data models for Resource User Group Role
// uses MongoDB Users and Groups collections // roles and permissions
trait Permission
trait Role
//case Object Admin extends Role
```

```
//case Object Contributer extends Role
//case Object Reader extends Role class User(
  val id: Long,
  val name: String,
  var Groups: List[Group]){
  lazy val resources: List[Resource] = List()
  def asfeed:String = ""
}
object User {
  def byUserId(UserId: Long): Option[User] = None
} class Group(
  val id: Long,
  val name: String,
  val title:String,
  val subtitle:String,
  var members: List[User]){
  lazy val resources: List[Resource] = List()
}
object Group {
  def byGroupId(groupId: Long): Option[Group] = None
} object Base {
  val uri = "http://Sgrouples.com"
  val UserUri = uri + "/User"
  val GroupUri = uri + "/group"
}
```

```
// See Atom Syndication format
// See AtomPub(Atom Publishing Protocol)
class GroupFeed(group: Group, resources: Seq[Resource]) {
  val feed =
  <feed xmlns="http://www.w3.org/2005/Atom">
    <title>{group.title}</title>
    <subtitle>{group.subtitle}</subtitle>
    <link href="{Base.groupUri}"/>
    <link href="{Base.groupUri}+group.id" rel="self"/>
    <updated>{resources(0).AtomDate}</updated>
    <author>
      <name>{group.name}</name>
      <uri>{Base.groupUri+ Group.id}</uri>
    </author>
    <id>http://example.com/</id>
    {for (resource <- resources) yield
    <entry>
      <title>{resource.title}</title>
      <link href={Base.groupUri + resource.slug + ".html"} rel="alternate"/>
      <id>{resource.AtomId}</id>
      <updated>{resource.AtomDate}</updated>
      <content type="text">{resource.text}</content>
      <author>
        <name>{resource.owner.name}</name>
        <uri>http:{Base.UserUri+"/"+resource.owner.id}</uri>
      </author>
    </entry>
    }
  </feed> def write(toFile: String) = XML.save(toFile, feed, "UTF-8", true, null)
}
```

```
class UserFeed(owner: User, resources: Seq[Resource]) {
  val feed =
  <feed xmlns="http://www.w3.org/2005/Atom">
    <title>{owner.name} + "feed"</title>
    <subtitle>User Feed</subtitle>
    <link href={Base.uri+"/User"}/>
    <link href={Base.uri+"/User/"+owner.id} rel="self"/>
    <updated>{resources(0).AtomDate}</updated>
    <author>
      <name>{owner.name}</name>
      <uri>{Base.uri+"/User/"+owner.id}</uri>
    </author>
    <id>{Base.uri}</id>
    {for (resource <- resources) yield
    <entry>
      <title>{resource.title}</title>
      <link href={Base.UserUri + resource.slug + ".html"} rel="alternate"/>
      <id>{resource.AtomId}</id>
      <updated>{resource.AtomDate}</updated>
      <content type="text">{resource.text}</content>
      <author>
        <name>{resource.owner.name}</name>
        <uri>http:{Base.UserUri+"about.html"}</uri>
      </author>
    </entry>
    }
  </feed> def write(toFile: String) = XML.save(toFile, feed, "UTF-8", true, null)
}
```

```
trait ResourceType class Resource(val title: String,
               val link: String,
               val updated: Date,
               val owner: User,
               val text: String,
               val GroupAccess: Map[Long,Role]) { lazy val dashedDate = {
    val dashed = new SimpleDateFormat("yy-MM-dd")
    dashed.format(updated)
  } lazy val AtomDate = {
    val rfc3339 = new SimpleDateFormat("yyyy-MM-dd'T'h:m:ss'-05:00'")
    rfc3339.format(updated)
  } lazy val slug = title.toLowerCase.replaceAll("\\W", "-")
  lazy val AtomId = "tag:"+ Base.uri + "," + dashedDate + ":/" + slug

}
```

ContentManager

```
package com.Sgrouples.content import com.Sgrouples.model._
import com.mongodb.casbah.Imports._
//import com.mongodb.casbah.conversions.scala._
```

```
// use a file store or gridFS?
//  RegisterJodaTimeConversionHelpers()

class ContentManager(dbConnection: String) {
  def addResourceToUserSpace(resource: Resource, UserId: String) = {
    // save resource to User store; get link
    // add resource and link to resoures collection
    // with owner property set to given UserId
  }
  def getResourcesForUser(UserId: String): List[Resource] = {
    // return all resources that are owned by given User
    List()
  }
  def getResourcesForUserForGroup(groupId: String, UserId: String) = {
    // return all resources in given Group
    // that are viewable to User
    List()
  }
  def addResourceToGroupSpace(resourceId: String, GroupId: String) = {
    // update resource with given resourceId
    // by adding GroupId ti its Group fielde
  }
  def getAccessForGroupForUser(groupId: String, UserId: String): List[Permission] = {
    // return list of Access Permissions
    List()
  }
} object TestContentManager {

//
  val mongoConn = MongoConnection()
```

```
    val mongoDB = mongoConn("mydb")
}
```

UserGroupManager

```
package com.Sgrouples.model class UserGroupManager(dbConnection: String) {
  def createUser(User: User): String = {
    // add User to Users collection
    // return objectId
    ""
  }
  def createGroup(admin: User, Group: Group): String = {
    // add Group to Groups collection
    // add User to Group with role of admin
    // return GroupId
    ""
  }
  def addUserToGroup(User: User, Group: Group, role: Role) = {
    // add User to Group with given role
    //
  }
  def inviteUsersToGroupWithRoles(Users: Map[String,Role], Group: Group) = {
    // add given Users to Group with invited status
    // send out invitations via InvitationManager

}
}
```

Data Model Example Code

```
// Users collection
admin = {
  name: {
    first: "Jonathan",
    middle: "",
    last: "Wolfe"
  },
  email: "walter@Sgrouples.com"
}
db.Users.save(admin)

User = {
  name: {
    first: "Jonathan",
    middle: "",
    last: "Wolfe"
  },
  email: "jwolfe@gmail.com"
}
db.Users.save(User)

// Groups collection
group = {
  name: "My First Group",
  color: "red",
}
db.groups.save(group)

// add an admin to the Group
```

```
groupAdmin = {
  UserId: "4dd580f1a11f6f0bd215edfb",
  role: "admin"
}
update = { "$push" : {members: GroupAdmin}}
db.groups.update({_id : ObjectId("4dd581baa11f6f0bd215edfc")}, update)
> db.groups.find()
{ "_id" : ObjectId("4dd581baa11f6f0bd215edfc"),
  "color" : "red",
  "members" : [ { "UserId" : "4dd580f1a11f6f0bd215edfb", "role" : "admin" } ],
  "name" : "My First Group"
}

// add a contributer to the Group
contributer = {
  UserId: "4dd590e9a11f6f0bd215edfe",
  role: "contributer"
}
update2 = { "$push" : {members: contributer}}
db.groups.update({_id : ObjectId("4dd581baa11f6f0bd215edfc")}, update2)
> db.groups.find()
{ "_id" : ObjectId("4dd581baa11f6f0bd215edfc"),
  "color" : "red",
  "members" : [
   {
     "UserId" : "4dd580f1a11f6f0bd215edfb",
     "role" : "admin"
   },
   {
     "UserId" : "4dd590e9a11f6f0bd215edfe",
     "role" : "contributer"
   }
```

```
  ],
  "name" : "My First Group"
}

// add a reader to the Group
reader = {
  name: {
    first: "ReadOnly",
    middle: "Q",
    last: "User"
  },
  email: "jwolfe@mac.com"
}
db.Users.save(reader)

groupReader = {
  UserId: "4dd59456a11f6f0bd215edff",
  role: "reader"
}
update3 = { "$push" : {members: GroupReader}}
db.groups.update({_id : ObjectId("4dd581baa11f6f0bd215edfc")}, update3)
> db.groups.find()
{ "_id" : ObjectId("4dd581baa11f6f0bd215edfc"), "color" : "red", "members" : [
    {
        "UserId" : "4dd580f1a11f6f0bd215edfb",
        "role" : "admin"
    },
    {
        "UserId" : "4dd590e9a11f6f0bd215edfe",
        "role" : "contributer"
    },
    {
```

```
        "UserId" : "4dd59456a11f6f0bd215edff",
        "role" : "reader"
    }
], "name" : "My First Group" }

// resources collection
resource = {
  owner: "jonathan@Sgrouples.com",
  type: "message",
  Groups: []
}
db.resources.save(resource)

db.groups.save(group)
db.groups.find()
{ "_id" : ObjectId("4dd581baa11f6f0bd215edfc"),
  "name" : "My First Group",
  "color" : "red"
}

// share a resource with a Group
// add the GroupId to the resource

> db.Users.find({_id : ObjectId("4dd580f1a11f6f0bd215edfb")})
{ "_id" : ObjectId("4dd580f1a11f6f0bd215edfb"),
  "name" : { "first" : "Jonathan", "middle" : "", "last" : "Wolfe" },
  "email" : "jonathan@Sgrouples.com"
}

> db.resources.find()
```

```
{ "_id" : ObjectId("4dd5839fa11f6f0bd215edfd"),
  "owner" : "jonathan@Sgrouples.com",
  "type" : "message",
  "groups" : [ ]
}
db.resources.update({_id : ObjectId("4dd5839fa11f6f0bd215edfd")},
          {"$push":{groups:"4dd581baa11f6f0bd215edfc"}})

> db.resources.find()
{ "_id" : ObjectId("4dd5839fa11f6f0bd215edfd"),
  "groups" : [ "4dd581baa11f6f0bd215edfc" ],
  "owner" : "jonathan@Sgrouples.com",
  "type" : "message"
}

// get all resources for a given User
db.reources.find({owner: "jonathan@Sgrouples.com"})
```

In the preferred embodiment, and as readily understood by one of ordinary skill in the art, the apparatus according to the invention will include a general or specific purpose server computer or distributed system programmed with computer software implementing the steps described above, which computer software may be in any appropriate computer language, including HTTP, C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of sharing information limited by permission, the method comprising the steps of:
   a user providing content to be shared to a data store;
   the user specifying to an online service a plurality of individuals or Groups with which to share the content;
   after the providing and specifying steps, automatically creating via the online service a new Group comprising the specified plurality;
   inviting the individuals or Groups to become members of the new Group;
   allowing an individual with a set permission level who is not the user to invite other members to join the new Group;
   allowing the individual to specify different individual permission levels for each new person that they invite;
   wherein a member of the new group can purchase an add-on which can then be used by everyone in the new group;
   displaying the content from the data store on demand to the online service from one of the individuals or a member of one of the Groups that has accepted membership in the new Group; and
   allowing members of the new group to share group content, wherein group content can have its own permissions, including those permissions delineated by members when posting the content.

2. The method of claim 1 wherein the user and each of the individuals and Groups are members of a same online service.

3. The method of claim 1 wherein the user and Groups are members of a same online service but each of the individuals may or may not be.

4. The method of claim 3 wherein the individuals who are not members of the online service are automatically invited by the online service to become members of the online service.

5. A tangible computer readable medium comprising computer software comprising computer readable code for sharing information limited by permission, the software comprising:
   code permitting a user to provide to an online service content to be shared;
   code permitting the user to specify a plurality of individuals or Groups with which to share the content;
   code, after the providing and specifying code executes, automatically creating a new Group comprising the specified plurality;
   code inviting the individuals or Groups to become members of the new Group;
   code allowing an individual with a set permission level who is not a creator of the Group to invite other members to join the new Group;
   code allowing the individual to specify different individual permission levels for each new person that they invite;
   code allowing a member of the new group to purchase an add-on;
   code allowing the add-on to be used by everyone in the new group;
   code displaying the content from a data store on demand to the online service from one of the individuals or a member of one of the Groups that has accepted membership in the new Group; and
   code allowing the specified plurality of the new Group to share group content, wherein group content can have its own permissions, including those permissions delineated by members when posting the content.

6. The tangible computer readable medium of claim 5 wherein the user and each of the individuals and Groups are members of a same online service.

7. The tangible computer readable medium of claim 5 wherein the user and Groups are members of a same online service but each of the individuals may or may not be.

8. The tangible computer readable medium of claim 7 wherein the individuals not members of the online service are automatically invited by the online service to become members of the online service.

9. A method of sharing information limited by permission, the method comprising the steps of:
   a first user providing first user content to be shared to a data store;
   the first user specifying to an online service a first member group formed from first group members comprising a first plurality of individuals or Groups with which to share the first user content;
   after the providing and specifying steps, automatically creating via the online service the first member group comprising the specified first group members;
   inviting the first group members to become members of the first member group;
   allowing a first group members to upload first group content to the data store;
   allowing first group members to share the first group content, wherein the first group content can have its own permissions, including those permissions delineated by members when uploading the content;
   a first group member specifying to the online service a second member group formed from second group members comprising a second plurality of individuals or Groups with which to share a first member content, the second group need not be members of the first member group;

the first member inviting an individual, which is not already a member of the first member group, to join the first member group;

the first user specifying access levels for each of the members of the first group and the first member specifying an access level for the invited individual; and displaying the content from the data store on demand to the online service from one of the individuals or a member of one of the Groups that has accepted membership in the second member group.

10. The method of claim 9 further comprising displaying a tag when the first user content is shared with the first member group, but not displaying the tag when the first user content is shared with a user who is not a member of the first member group.

11. The method of claim 9 permitting a member of the first member group to purchase an add-on which can then be used by all of the other members of the first member group.

12. The method of claim 9 wherein the first and second plurality of individuals or Groups are members of a same online service.

13. The method of claim 9 wherein the first user and Groups are members of a same online service but each of the first and second plurality of individuals may or may not be.

14. The method of claim 13 wherein the individuals who are not members of the online service are automatically invited by the online service to become members of the online service.

15. The method of claim 9 wherein the first member can not specify an access level for an invited individual which is greater than the access level that the first user specified for the first member.

* * * * *